United States Patent
Rasmussen et al.

(10) Patent No.: US 12,549,213 B2
(45) Date of Patent: Feb. 10, 2026

(54) MAGNETIC ACCESSORY FOR ELECTRONIC DEVICES

(71) Applicant: Apple Inc., Cupertino, CA (US)

(72) Inventors: Timothy J. Rasmussen, San Jose, CA (US); Geng Luo, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 604 days.

(21) Appl. No.: 17/935,054

(22) Filed: Sep. 23, 2022

(65) Prior Publication Data

US 2024/0106484 A1    Mar. 28, 2024

(51) Int. Cl.
*H04B 1/3877*    (2015.01)

(52) U.S. Cl.
CPC .................. *H04B 1/3877* (2013.01)

(58) Field of Classification Search
CPC ...................................... H04B 1/3877
See application file for complete search history.

(56) References Cited

U.S. PATENT DOCUMENTS

| | | | | |
|---|---|---|---|---|
| 5,555,302 A * | 9/1996 | Wang | ................. | B60R 11/0241 |
| | | | | 379/426 |
| 8,627,953 B1 * | 1/2014 | Yeo | ...................... | H05K 5/0221 |
| | | | | 206/320 |
| 8,638,557 B2 * | 1/2014 | Tsai | ...................... | F16M 13/00 |
| | | | | 345/169 |
| 9,749,002 B1 * | 8/2017 | Fan | ........................ | H04M 1/04 |
| 9,797,543 B2 * | 10/2017 | Lin | ........................ | F16M 13/00 |
| 9,955,598 B1 * | 4/2018 | Wen | ..................... | H05K 5/0204 |
| 10,001,153 B1 * | 6/2018 | Fan | ........................ | F16M 13/00 |
| 10,125,921 B2 | 11/2018 | Khodapanah et al. | | |
| 10,419,054 B1 * | 9/2019 | VanTassell | .............. | H04M 1/04 |
| 10,420,407 B2 * | 9/2019 | Whitten | ................... | B62J 11/00 |
| 10,663,104 B2 * | 5/2020 | Yang | ..................... | H04B 1/3877 |
| 11,265,035 B1 * | 3/2022 | Zhang | ................. | F16M 11/105 |
| 11,552,667 B2 * | 1/2023 | Balderston | ............ | H04M 1/725 |
| 12,031,669 B2 * | 7/2024 | Whitten | ................... | A45F 5/10 |
| 2012/0037673 A1 * | 2/2012 | Chen | ...................... | A45C 11/00 |
| | | | | 224/191 |
| 2012/0312936 A1 * | 12/2012 | Huang | ................. | F16M 11/041 |
| | | | | 248/316.1 |

(Continued)

*Primary Examiner* — Jinsong Hu
*Assistant Examiner* — Rui M Hu
(74) *Attorney, Agent, or Firm* — BAKERHOSTETLER

(57) ABSTRACT

This application relates to support accessories for use with portable and/or handheld electrical devices having a magnetic element therein. Such a support accessory comprises a housing that defines an internal volume. In addition, a magnetic attachment element is housed within the internal volume and capable of a magnetic attachment with the magnetic element of the handheld device. The support accessory includes an extendable support element carried by the housing and capable of transitioning between a retracted state and an extended state. In an extended state, the extendable support element at least partially extends outward through an opening in the housing such that the extendable support element is capable of providing support to the handheld electronic device relative to an auxiliary support structure (e.g., a tripod). The support accessory may establish electrical communication with the handheld device and affect a function of the handheld device.

20 Claims, 10 Drawing Sheets

(56) References Cited

U.S. PATENT DOCUMENTS

| | | | |
|---|---|---|---|
| 2015/0060624 A1* | 3/2015 | Huang | F16M 11/105 |
| | | | 248/316.4 |
| 2016/0003270 A1 | 1/2016 | Franklin | |
| 2017/0108167 A1* | 4/2017 | Fan | F16M 11/10 |
| 2018/0043840 A1* | 2/2018 | Minn | B60R 11/0241 |
| 2019/0260865 A1* | 8/2019 | Yang | F16M 13/02 |
| 2020/0081483 A1* | 3/2020 | Laurent | G06F 1/166 |
| 2020/0212693 A1* | 7/2020 | Alves | H02J 50/10 |
| 2021/0005368 A1 | 1/2021 | Breiwa et al. | |
| 2021/0046885 A1* | 2/2021 | Jankura | F16B 2/04 |
| 2021/0099027 A1* | 4/2021 | Larsson | H04B 5/77 |
| 2021/0109569 A1* | 4/2021 | Barnett | G06F 1/1656 |
| 2022/0137491 A1* | 5/2022 | Stankie | H04M 1/724092 |
| | | | 396/428 |
| 2022/0159114 A1* | 5/2022 | Shaw | H04M 1/026 |
| 2022/0353359 A1* | 11/2022 | Donna | A45C 11/00 |
| 2022/0381394 A1* | 12/2022 | Jankura | F16M 11/14 |
| 2023/0033640 A1* | 2/2023 | Kim | H02J 50/005 |
| 2023/0047107 A1* | 2/2023 | Cheng | H01Q 21/205 |
| 2023/0142845 A1* | 5/2023 | Balderston | H04M 1/04 |
| | | | 455/575.1 |
| 2023/0198301 A1* | 6/2023 | Peters | A45C 11/00 |
| | | | 320/108 |
| 2023/0223976 A1* | 7/2023 | Weng | H04M 1/04 |
| | | | 455/575.8 |
| 2023/0291429 A1* | 9/2023 | McKeefery | H04B 1/3883 |
| 2023/0336036 A1* | 10/2023 | Larsson | H02J 50/10 |
| 2023/0407683 A1* | 12/2023 | Penny | E05B 73/0017 |
| 2024/0322608 A1* | 9/2024 | Li | H02J 50/40 |
| 2025/0073608 A1* | 3/2025 | Mazar | F16M 11/16 |

\* cited by examiner

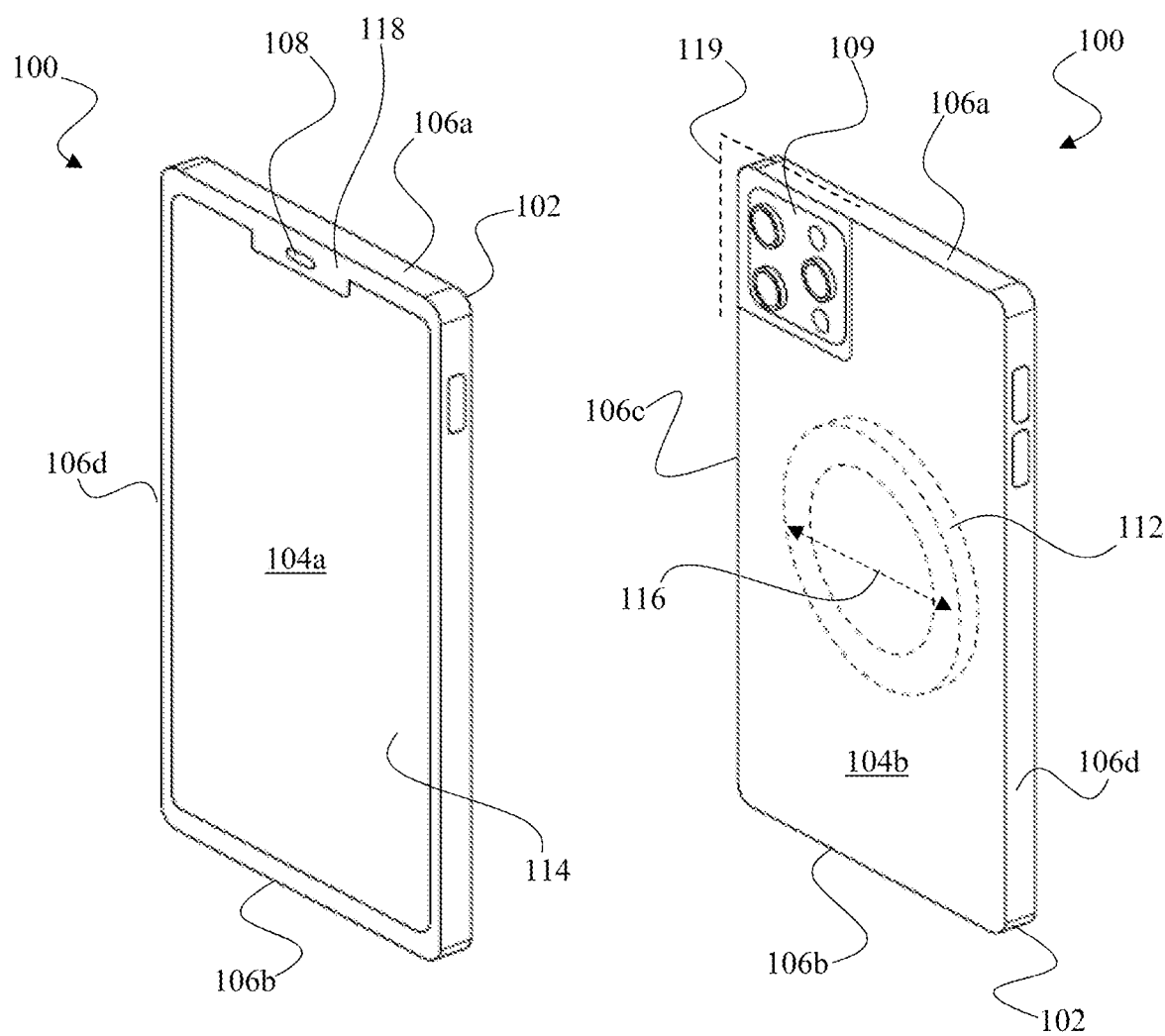
*FIG. 1A*  *FIG. 1B*

MAGNETIC ACCESSORY FOR ELECTRONIC DEVICES

FIELD

The following description relates to magnetic accessory devices. In particular, the following description relates to stands, supports, and mounts that can be used with portable electronic devices.

BACKGROUND

Portable electronic devices, such as mobile phones and tablets, are increasingly advanced in their sheer computing power and utility due to recent improvements in both their technical and design aspects. As a result, such portable electronic devices are now a constant companion for many users. They are often used during, or in conjunction with, many daily activities, either while performing an activity or in a manner that supplements an activity. In addition, due to their increasing functionality, compactness, and mobility, various portable electronic devices may be considered, in some circumstances, a suitable rival to the larger scale and less portable other electronic computing devices, which may include laptops, personal computers (PCs), smart televisions, vehicle navigation and/or entertainment units, etc. In such instances, a user might conceivably decide to entirely substitute one of these other electronic computing devices with a portable electronic device, or to use a portable electronic device interchangeably with another electronic computing device as a matter of personal preference. Additionally, portable electronic devices may be used cooperatively with other electronic computing devices.

As mentioned above, in some instances, a portable electronic device may be functionally interoperable and/or structurally engaged with one or more separate electronic computing device(s). For example, one or more functions or features of a portable electronic device may be used in conjunction with other electronic computing device(s) to form an interoperable system. Accordingly, in certain instances, a portable electronic device may be capable of unilaterally or bilaterally transmitting and/or receiving information to and from the other electronic computing device(s) using, for example, one-way and/or two-way electronic communication methods and protocols established between the several electronic computing devices. Such communication pathways may comprise a wired connection and/or a wireless connection. Suitable examples of a wired connection may include Ethernet, USB-A, USB-C, micro-USB, and lightening cables. Further, suitable examples of a wireless connection may include Wi-Fi, Bluetooth®, ZigBee®, Near-Field Communications (NFC), and a cellular data network, etc. By interconnecting a portable electronic device with other separate electronic computing devices in this manner, various capacities and capabilities specific to each of the electronic devices may be advantageously leveraged such that, together, the multiple electronic devices form a single collective system that is highly-optimized. For example, as mentioned above, many portable electronic devices are, characteristically, easily transportable because of their relative compact size and shape, as well as their light weight. However, a prominent drawback of the purposeful compactness of portable electronic devices is a corresponding limitation in the amount of feasible data storage capacity relative to the larger data storage capacities of other electronic computing devices. Therefore, in some instances, a portable electronic device may benefit from the ability to transfer particular types of data to a separate electronic computing device for longer term storage, thereby beneficially alleviating the data storage burden of the portable electronic device.

In another ubiquitous example, various portable electronic devices are considered a valuable photography and videography tool due to their compactness and portability, and, importantly, on account of the vast improvements made to the camera systems and camera functions, as well as the processing circuitry and user-friendly content capturing and editing applications. In some instances, the high quality photo and video output of various portable electronic devices may be comparable or superior to professional-grade cameras and recording equipment. Accordingly, in such examples, utilizing the camera and/or video features of the portable electronic device may provide an optimal operating and visualizing environment for performance of routine and ordinary tasks, such as video conferencing or videotelephony operations, as well as for the creation of more complex forms of multimedia (including image, audio, and/or video) content.

In order to effectively use and manage a portable electronic device physically, it is practical to be able to prop up and support the portable electronic device in, for example, an elevated upright, or in a semi-upright, position in relation to a user such that the user is able to easily and instinctively access and view the portable electronic device. Oftentimes, a user may use one or both of the user's hands to position and support the device while in use. However, frequently a user may instead wish to be "hands free" such that the portable electronic device requires other mechanisms for supporting and retaining the portable electronic device in the desired position. As such, there exists support devices that, when structurally engaged with a portable electronic device, support the portable electronic device in a user's desired position. However, these existing support devices suffer from several disadvantages. For example, the support device is an additional loose and oftentimes cumbersome component that must be transported together with the portable electronic device. In another example, various existing support devices for portable electronic devices rely on a gripping or a clamping element that actively grips onto the portable electronic device in order to steady and secure the portable electronic device with the support device. However, over the lifetime of these support devices, the gripping or clasping elements endure frequent mechanical stress, thereby causing them to significantly weaken over time due to wear and tear. Furthermore, the gripping or clasping elements may damage the portable electronic device at the point(s) of contact. In addition, the engagement and/or disengagement between the portable electronic device and various existing support devices is oftentimes a multi-step and multi-part process that may be unwieldy and awkward.

In a further example, various structural mechanisms employed by the majority of existing support devices that structurally engage and/or secure the portable electronic device thereto, oftentimes, when engaged, restrict the portable electronic device to only a single orientation. As a result, the portable electronic device must first be removed from the support device (and subsequently reengaged) in order to make even slight or basic adjustments to the orientation of the portable electronic device (e.g., shift between a landscape orientation and a portrait orientation). Also, the structural mechanisms for engaging and securing the portable electronic device at the support device may, in some instances, obstruct a usable or functional portion of the portable electronic device, or cause structural damage to the portable electronic device.

Thus, there is a significant need for a support device that is compact and easily adjustable, and effectively engages and positions a portable electronic device into a desired position relative to a user and, in some circumstances, in cooperative engagement with other electronic computing devices or additional or auxiliary support structures (e.g., camera tripod), while leaving little to no footprint with respect to the portable electronic device and any other structure. Furthermore, there is a significant need that such a support device be easily and simplistically engaged with and disengaged from the portable electronic device in a single step and with minimal effort.

Accordingly, in the following description, exemplary embodiments of such support devices for use with a portable electronic device are specifically described and are depicted in greater detail.

SUMMARY

This paper describes various exemplary embodiments that relate to magnetic support accessory devices for supporting portable or handheld electronic devices in relation to other structures or surfaces.

According to some embodiments of the present disclosure, a support accessory that is suitable for use with a handheld electronic device having a magnetic element is described. The support accessory comprises a housing that defines an internal volume, and further comprises a magnetic attachment element that is housed within the internal volume and capable of a magnetic attachment with the magnetic element. Further, the support accessory comprises an extendable support element that is carried by the housing within the internal volume and is capable of transitioning between a retracted state and an extended state. The retracted state comprises the extendable support element wholly disposed within the internal volume. Further, the extended state comprises the extendable support element at least partially extended outward through an opening in the housing such that, during the magnetic attachment, the extendable support element is capable of providing support to the handheld electronic device. In addition, the housing may comprise a first housing part, a second housing part, and a rotatable control element positioned between the first housing part and the second housing part. The rotatable control element, when it is rotated, is capable of transitioning a state of the extendable support element between the retracted state and the extended state. Also, the rotatable control element may comprise a contact surface that, upon a first degree of rotation of the rotatable control element, abuts a projecting portion of the extendable support element such that the extendable support element is in the extended state. In addition, upon a second degree of rotation of the rotatable control element, the contact surface may be spaced away from the projecting portion of the extendable support element such that the extendable support element is in the retracted state. Further, the extendable support element may comprise a connector element that is capable of coupling to a corresponding connector element of an auxiliary support structure. Also, the magnetic attachment is such that an orientation of the handheld electronic device is adjustable during the magnetic attachment and while the connector element is coupled to the corresponding connector element of the auxiliary support structure. Further, the housing may be cylindrical.

According to further embodiments of the present disclosure, there is described a support accessory suitable for use with a handheld electronic device having a magnetic element therein. The support accessory comprises a housing that defines an internal volume, and further comprises a magnetic attachment element housed within the internal volume and capable of a magnetic attachment with the magnetic element. Further, the support accessory comprises an extendable support element carried by the housing within the internal volume and capable of transitioning between a retracted state and an extended state. The retracted state comprises the extendable support element wholly disposed within the internal volume. Further, the extended state comprises the extendable support element at least partially extended outward through an opening in the housing such that, during the magnetic attachment, the extendable support element is capable of providing support to the handheld electronic device. In addition, the support accessory comprises a rotatable control element that, when rotated, is capable of transitioning a state of the extendable support element between the retracted state and the extended state. The rotatable control element may comprise a contact surface that, upon a first degree of rotation of the rotatable control element, abuts a projecting portion of the extendable support element such that the extendable support element is in the extended state. Further, upon a second degree of rotation of the rotatable control element, the contact surface is spaced away from the projecting portion of the extendable support element such that the extendable support element is in the retracted state. Additionally, the extendable support element may comprise a connector element that is capable of coupling to a corresponding connector element of an auxiliary support structure. Also, the magnetic attachment is such that an orientation of the handheld electronic device is adjustable during the magnetic attachment and while the connector element is coupled to the corresponding connector element of the auxiliary support structure. Further, the rotatable control element is a first rotatable control element, and the housing further comprises a second rotatable control element that is capable of electrical communication with, and affecting a function of, the handheld electronic device. Further, the housing may be cylindrical.

According to some exemplary embodiments of the present disclosure, there is described a support accessory that is suitable for use with a handheld electronic device having a magnetic element therein. The support accessory comprises a housing that defines an internal volume, and further comprises a magnetic attachment element housed within the internal volume and capable of a magnetic attachment with the magnetic element. Further, the support accessory comprises an extendable support element carried by the housing within the internal volume and capable of transitioning between a retracted state and an extended state. The retracted state comprises the extendable support element wholly disposed within the internal volume. Further, the extended state comprises the extendable support element at least partially extended outward through an opening in the housing such that, during the magnetic attachment, the extendable support element is capable of providing support to the handheld electronic device. Also, the support accessory further comprises a rotatable control element capable of electrical communication with, and affecting a function of, the handheld electronic device. In addition, the electrical communication comprises an electrical communication pathway that includes at least one of a near-field communication (NFC) apparatus, an inductive charging coil apparatus, and a wireless Bluetooth® apparatus. Additionally, the extendable support element may comprise a connector element capable of coupling to a corresponding connector element of an auxiliary support structure. Further, the magnetic attachment is such that an orientation of the handheld electronic device is adjustable while the connector element of the extendable support element is coupled to the corresponding connector element of the auxiliary support structure. Also, the auxiliary support structure may comprise a camera tripod and the function is associated with a camera assembly of the handheld electronic device. In addition, the housing comprises a first housing part and a second housing part, and the rotatable control element comprises the first housing part.

Other aspects and advantages of the invention will be apparent from the following detailed description taken in conjunction with the accompanying drawings, which illustrate, by way of example, the principles of the described embodiments.

This summary is provided merely for purposes of summarizing some example embodiments to provide a basic understanding of some aspects of the subject matter described herein. Therefore, it will be appreciated that the above-described features are merely examples and should not be construed to narrow the scope or spirit of the subject matter described herein in any way. Other features, aspects, and advantages of the subject matter described herein will become apparent from the following detailed description, figures, and claims.

BRIEF DESCRIPTION OF THE DRAWINGS

The disclosure will be readily understood by the following detailed description in conjunction with the accompanying drawings, wherein like reference numerals designate like structural elements.

FIG. 1A illustrates an isometric view of an exemplary embodiment of a portable electronic device, according to a first viewpoint;

FIG. 1B illustrates an isometric view of the portable electronic device of FIG. 1B, according to a second viewpoint;

DETAILED DESCRIPTION

Figure 2A:
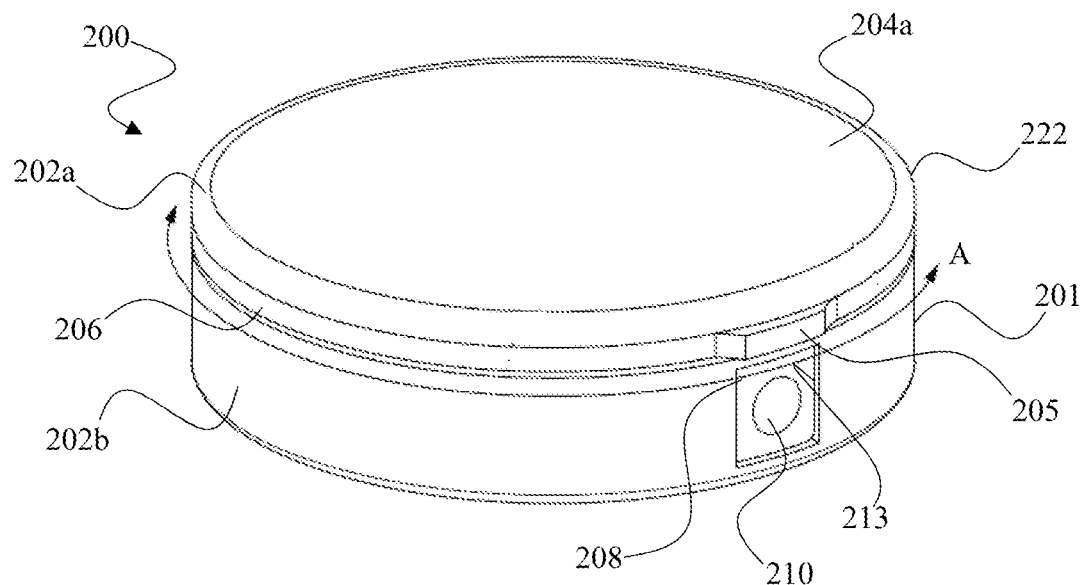
FIG. 2A illustrates an isometric view of an exemplary embodiment of a magnetic support accessory.

Reference will now be made in detail to the representative embodiments that are illustrated in the accompanying drawing figures. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the embodiments described herein. Although these embodiments are described in sufficient detail to enable one skilled in the art to practice the described embodiments, it is understood that these examples are not limiting such that other embodiments may be used, and alterations may be made, without departing from the spirit and scope of the described embodiments.

As mentioned above, this application is directed to magnetic support devices for supporting and positioning a portable electronic device in relation to a user in order that the portable electronic device may be easily accessed, viewed, manipulated, and used or controlled while located in situ. As non-limiting examples, portable electronic devices that are described herein may refer to mobile phones, smartphones, and tablet computing devices, etc. The exemplary embodiments of the magnetic support devices that are shown and described herein provide an enhanced simplicity, portability, physical compactness, durability, practicality, and adjustability, and can be used and applied in a broad array of environments and applications. Further, as discussed in detail below, the manner in which, according to the exemplary embodiments described, the magnetic support device engages a portable electronic device, does not cause any structural damage or cosmetic damage to the portable electronic device and any other structure.

In some exemplary embodiments, the structural engagement between the support device and a back surface of a portable electronic device is entirely non-invasive, thereby preventing the support device from causing any structural damage or cosmetic blemishes to the portable electronic device. For example, the structural engagement that is between the support device and a portable electronic device may be in the form of a magnetic attachment.

Further, according to some exemplary embodiments, the magnetic support device comprises one or more extensions capable of coupling, connecting, or affixing the magnetic support device and, by extension, any portable electronic device to which the magnetic support device is engaged, to an underlying support structure or surface. In certain exemplary embodiments, the one or more extensions may provide for the magnetic support device to be balanced or seated upon an underlying support surface or structure. Such underlying support structures or surfaces may include, but are not limited to, a table or a desktop, an electronic computing device, a display screen or portion of an electronic computing device, a vehicle dashboard, a camera tripod, a pole, a wearable accessory, an article of clothing, etc.

Additionally, according to certain exemplary embodiments, the extension(s) of the magnetic support device may be retracted or collapsed towards, or to a location within, a main body of the magnetic support device when the one or more extensions are not deployed. As a result, the magnetic support device may have a compact, smooth, and slim exterior and profile when the one or more extensions (or projections) is/are not in use.

In addition, according to some exemplary embodiments, the magnetic attachment existing between a magnetic support device and a portable electronic device allows for in situ adjustments to the positioning of the portable electronic device without first requiring that the portable electronic device be disengaged or removed from the magnetic support device before being repositioned and then subsequently reengaged with the portable electronic device. For example, as described in greater detail below, according to some exemplary embodiments, the structural engagement occurring between the magnetic support device and, for example, a back surface of the portable electronic device may allow for the portable electronic device to be manually rotated or swiveled an unbridled 360° degrees while the portable electronic device remains engaged with the magnetic support device. Thus, this maneuverability allows for the portable electronic device to be switched or otherwise shifted between, for example, a portrait orientation and a landscape orientation. Alternatively, the portable electronic device may be manually rotated or swiveled as just described, but according to a limited or restricted range of motion that is less than a complete 360° degrees. In a further example, according to some exemplary embodiments of a magnetic support device, the one or more extensions thereof may comprise a rotatable or a pivotable portion or joint (e.g., a gimbal, hinge assembly, etc.). According to some embodiments, one or more extensions of a magnetic support device are coupled, either directly or indirectly, to a main body of the magnetic support device at, or by way of, a rotatable or a pivotable joint (e.g., a gimbal, a hinge assembly, etc.). As such, when the magnetic support device is structurally supporting a portable electronic device, the portable electronic device may then be manually rotated or pivoted in conjunction with the magnetic support device. Thus, an angle that is formed between the portable electronic device and an underlying support structure or support surface vis-d-vis the magnetic support device may be adjusted in situ such that the portable electronic device may be tilted or pitched towards and/or away from a user.

Further, as mentioned above, as a result of the significant developments in the photographic and videographic capabilities of, for example, the camera, audio, and processing components of portable electronic devices, the use of these portable electronic devices as influential multimedia capturing tools is widespread and frequent. In consideration of this prevalent use, the precise point or region of the coupling or attachment between the magnetic support device and a portable electronic device, as well as the shape and the dimensions of the magnetic support device relative to, or in proportion to, the portable electronic device are such that, according to some embodiments, the resulting placement of the magnetic support device ensures that the components of the portable electronic device needed to accomplish its photographic and/or videographic functions are not physically obstructed by any part of the magnetic support device. For example, in circumstances in which a portable electronic device includes one or more microphones, speakers, and/or camera lens assemblies that are necessarily exposed at one or more areas of its external surface, the dimensions and the placement of the magnetic support device relative to the portable electronic device when engaged may be determined such that the one or more microphones, speakers, and/or camera lens assemblies are automatically and invariably positioned above, outside of, or away from, the magnetic support device.

Further, according to some embodiments, the magnetic support accessory may be configured to establish unidirectional or bi-directional communication with a portable electronic device to which the magnetic support accessory is coupled or attached. This electronic communication may, for example, provide for the exchange of identifying or authenticating information between components. In addition, the magnetic support accessory may comprise a control interface that may be operated by a user to control various parameters, features, and/or functions of the portable electronic device.

Accordingly, these and other exemplary embodiments are discussed below with reference to FIGS. 1A-1B, 2A-2D, 3, 4, 5A-5B, 6, 7A-7B, 8, 9, 10, 11, and 12. However, those that are skilled in the art will readily appreciate that the detailed description that is given herein and with respect to these figures is for explanatory purposes only and should not be construed as limiting.

FIGS. 1A-1B depict isometric views of an exemplary embodiment of a portable electronic device 100. As depicted, the portable electronic device 100 may be in the form of a mobile wireless communication device. Examples of mobile wireless communication devices include, but are not limited to, mobile telephones, smartphones, and tablet devices.

Portable electronic device 100 may include a housing 102, that provides an internal volume (or storage location) for several internal components of portable electronic device 100. Housing 102 may comprise a metal housing that is composed of one or more of aluminum, stainless steel, or a metal alloy or metal composite. Alternatively, housing 102 may be formed from one or more non-metals. In order to establish points of reference for the following description, FIG. 1A may be defined as depicting a portable electronic device 100 according to a first viewpoint. Further, FIG. 1B may be defined as depicting portable electronic device 100 according to a second viewpoint, wherein the second viewpoint is opposite the first viewpoint. Further, portable electronic device 100 may include several surfaces or sides. For example, as illustrated in FIG. 1A, the housing 102 may include a first surface 104a that lies perpendicular to four side surfaces, i.e., 106*a*, 106*b*, 106*c*, and 106*d*. Further, side surface 106*a* is positioned opposite from and parallel to side surface 106*b*. Additionally, side surface 106*c* is positioned opposite from and parallel to side surface 106*d*. In the viewpoint depicted in FIG. 1B, the four side surfaces 106*a*, 106*b*, 106*c*, and 106*d* are also shown. Further, also shown in FIG. 1B is a second surface 104*b* of housing 102, wherein the second surface 104*b* is located opposite from and parallel to the first surface 104*a*. According to his particular embodiment, the first surface 104*a* may be characterized as a forward facing surface from the perspective of a user who is operating the portable electronic device. Thus, the first surface 104*a* may comprise a display surface 114 by which a user can interact with and control various functions of the portable electronic device 100. By extension, second surface 104*b* may be characterized as a rearward facing surface or back surface of portable electronic device 100. Again, for purposes of establishing points of reference in view of the following discussion, side surfaces 106*a*, 106*b*, 106*c*, and 106*d* may also be referred to herein as first, second, third, and fourth side surfaces, respectively. Each of surfaces 104*a*, 104*b*, 106*a*, 106*b*, 106*c*, and 106*d* may constitute separate parts of housing 102 that are subsequently assembled together to form housing 102 during the manufacturing process. Alternatively, the surfaces 104*a*, 104*b*, 106*a*, 106*b*, 106*c*, and 106*d* comprise a single integral fabricated piece that is subsequently molded into a pre-determined desired form (such as the shape that is depicted in FIGS. 1A and 1B) during the manufacturing process.

Further, according to some exemplary embodiments, portable electronic device 100 may include one or more input and/or output ("I/O") connectors or ports (not shown) (e.g., a Universal Serial Bus ("USB") port) at its housing 102 (e.g., at any of the surfaces 104*a*, 104*b*, 106*a*, 106*b*, 106*c*, and 106*d*) that permit wired communication with, for example, separate electronic computing device(s) and/or an external power source. Additionally, the portable electronic device 100 may include one or more components (not shown) within the housing 102 for establishing wireless communication with one or more separate electronic computing device(s). Such components may include, but are not limited to, one or more antennas that are used to conduct short-range radio frequency ("RF") communications.

Also with reference to the exemplary embodiment depicted in FIGS. 1A and 1B, portable electronic device 100 may further include one or more camera assemblies that capture and/or record photographic images and video. In certain embodiments, the camera assemblies may include one or more camera lens assemblies (e.g., lens assemblies 108 and 109 shown in FIGS. 1A and 1B), which, as shown, are necessarily exposed to the external environment. According to this particular embodiment, the camera lens assembly 108 is positioned at a region 118 of surface 104*a*, wherein region 118 is in relatively close proximity to side surface 106*a*. Further, the camera lens assembly 109 is positioned at a corner region 119 of surface 104*b*.

Furthermore, as described in greater detail below, the portable electronic device 100 may comprise one or more magnetic elements that may be positioned at one or more locations within housing 102. According to the exemplary embodiment of FIGS. 1A and 1B, portable electronic device 100 includes a magnetic element 112 positioned within housing 102. In this particular embodiment, the body of magnetic element 112 has a circular or annular ring shape having an outermost diameter 116. Further, according to certain exemplary embodiments, the magnetic element 112 may comprise a set or an array of discrete magnets (not shown) that are positioned adjacent or in close proximity to each other to form the circular or annular shape depicted in FIG. 1B.

Referring now to FIG. 2A through 2D, generally depicted therein is an exemplary embodiment of a magnetic support accessory or device 200 capable of supporting a portable electronic device, such as portable electronic device 100 that is depicted in FIGS. 1A and 1B. These figures, as with the other included figures, are shown for illustrative purposes and do not limit either the possible embodiments or the appended claims.

It should be noted that for purposes of the present description, a number of different categories of devices can be distinguished. As used herein, a "portable electronic device" or "handheld device" refer generally to any electronic device that is portable and consumes power and provides at least some interaction with the user. Examples of portable electronic devices include, but are not limited to, smartphones and other mobile phones, tablet computers, laptop computers, wearable devices (e.g., smart watches, headphones, earbuds, etc.), and any other electronic device that a user may carry or wear.

Further, an "accessory device" (or "accessory") refers generally to a device that is useful in connection with a portable electronic device to enhance the functionality and/or the esthetics of the portable electronic device.

Magnetic support accessory 200 can be easy to use and easy to connect to a portable electronic device. For example, the magnetic support accessory 200 can include a magnetic attachment feature that intuitively and efficiently engages, attaches, or couples the magnetic support accessory 200 to, for example, a rearward facing surface or back surface of a portable electronic device (see e.g., surface 104*b* of portable electronic device 100 set forth in FIGS. 1A and 1B). Once the components are engaged, magnetic support accessory 200 is capable of supporting the portable electronic device in a desired position at, or on, a separate underlying supporting structure or surface. Further, as described in detail below, the magnetic support accessory may comprise one or more components that are in unidirectional or bi-directional electrical communication with the engaged portable electronic device such that a user has the ability to control one or more settings, parameters, and/or functions of the portable electronic device vis-à-vis the magnetic support accessory.

Magnetic support accessory 200 can fit or conform well with a portable electronic device (e.g., portable electronic device 100 shown in FIGS. 1A and 1B) and provides a small, compact, and efficient form factor that can be readily carried along with, or nearby, the portable electronic device. Magnetic support accessory 200 can physically engage or attach to portable electronic device 100 in order to provide a structural mechanism or structural apparatus for independently supporting portable electronic device 100 on or at an underlying supporting structure or surface, thus positioning the portable electronic device in a readily viewable and accessible position while leaving the user "hands-free" from the portable electronic device if desired.

Figure 2B:
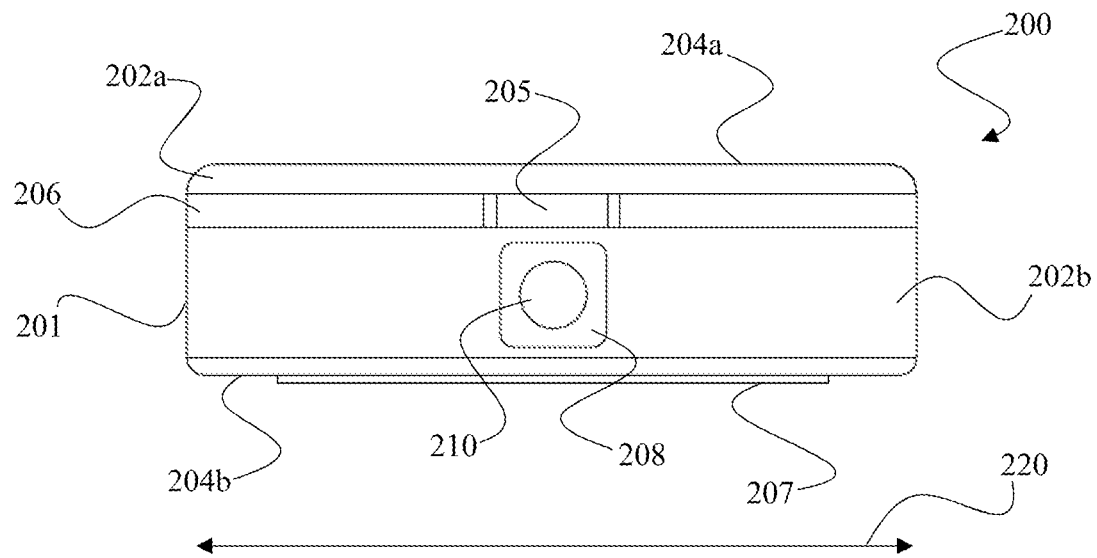
FIG. 2B illustrates a side view of the magnetic support accessory of FIG. 2A.
Figure 2C:
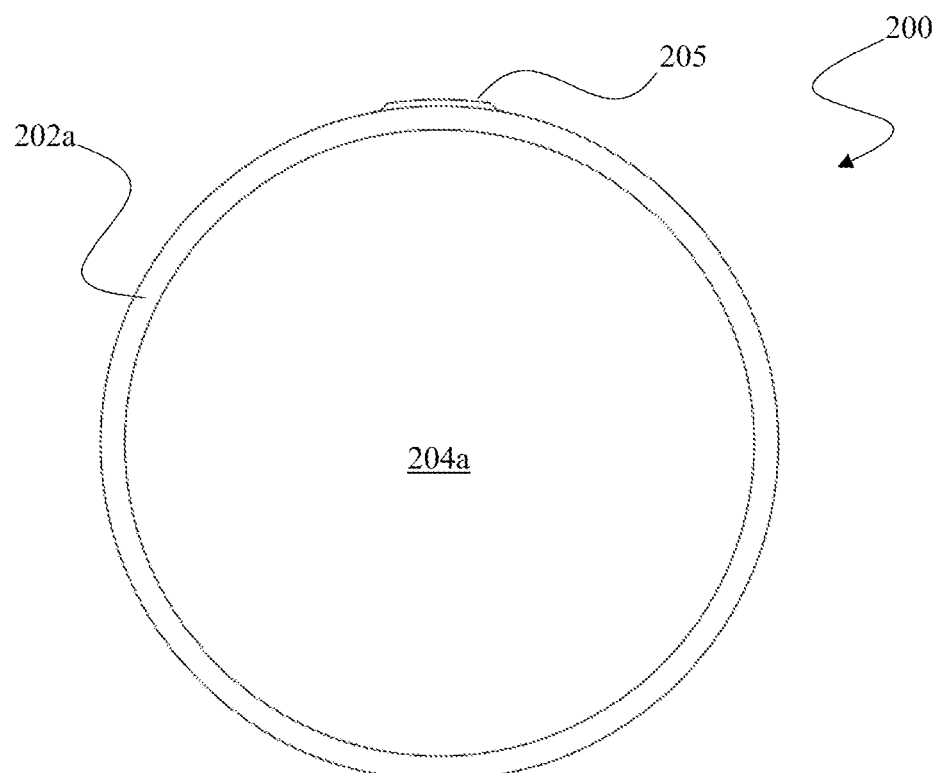
FIG. 2C illustrates a top view of the magnetic support accessory of FIG. 2A.
Figure 2D:
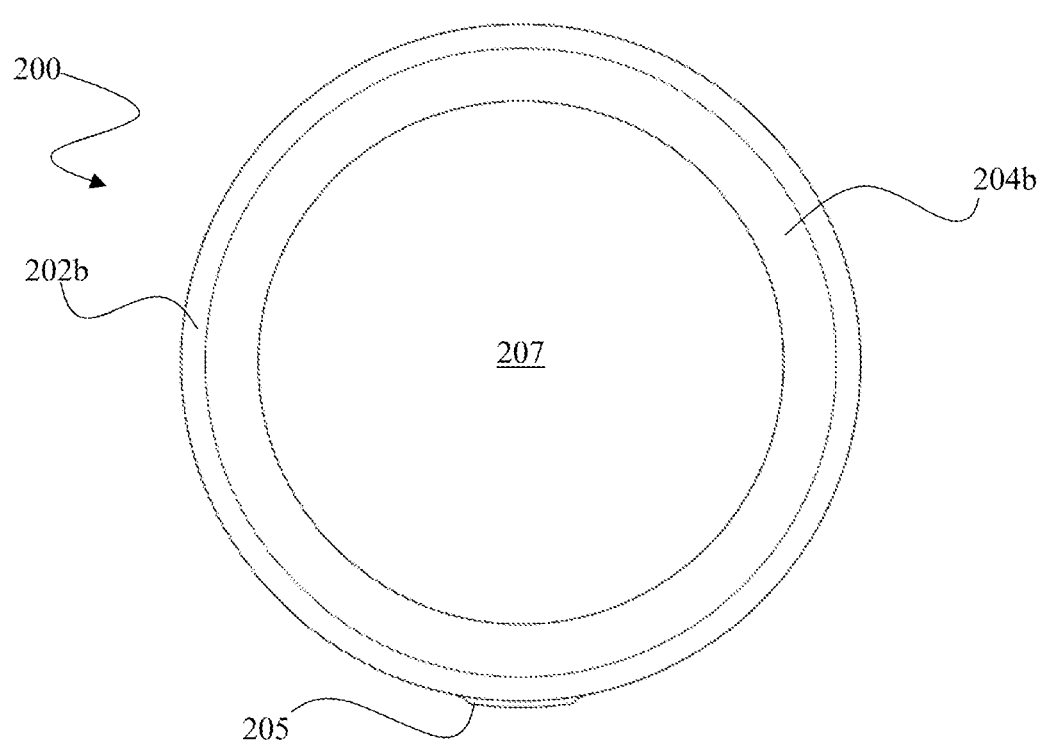
FIG. 2D illustrates a bottom view of the magnetic support accessory of FIG. 2A.

Beginning with FIG. 2A, there is depicted a perspective view of magnetic support accessory 200. Further, FIG. 2B depicts a side view of magnetic support accessory 200. In addition, depicted in FIG. 2C is a top view of magnetic support accessory 200. Lastly, FIG. 2D depicts a bottom view of magnetic support accessory 200. Therefore, FIGS. 2C and 2D depict opposite faces of magnetic support accessory 200. As shown in FIGS. 2A through 2D, the magnetic support accessory 200 has a three-dimensional disc-like or "puck"-like shape that comprises, for example, a cylindrical housing 201. Further, the housing 201 comprises a first housing part 202a and a second housing part 202b located opposite of the first housing part 202a. In this particular embodiment, first housing part 202a may be characterized as a cap or a lid of the magnetic support accessory 200. In addition, second housing part 202b may constitute a main body of the magnetic support accessory 200. As depicted, first housing part 202a has a first exterior surface 204a. Similarly, second housing part 202b has a second exterior surface 204b. According to some embodiments, the first housing part 202a and the second housing part 202b may comprise a single fabricated piece that is, for example, molded into a desired shape. Alternatively, in other embodiments (such as the embodiment shown in FIGS. 2A-2D), each of the first housing part 202a and the second housing part 202b constitutes a separate piece or structure. In such embodiments, the first and the second housing parts 202a and 202b may be coupled to, or are otherwise joined together, at a seam or a junction to form the housing 201. As described in detail below, the housing 201 comprises an internal volume in which one or more structures are disposed. It should be noted that FIGS. 2A through 2D depict an exterior of the magnetic support accessory 200 only and, therefore, the internal volume is not shown in these figures.

As mentioned above, in this particular embodiment, the housing 201 comprises a cylindrical housing as one non-limiting example. However, the housing 201 may comprise any suitable shape and dimension that permits the magnetic support accessory 200 to provide the function(s) described below. For example, the housing 201 may be in the form of a three-dimensional cube or block having rectangular, square, or oval, etc., shaped surfaces or sides thereof.

Figure 3:
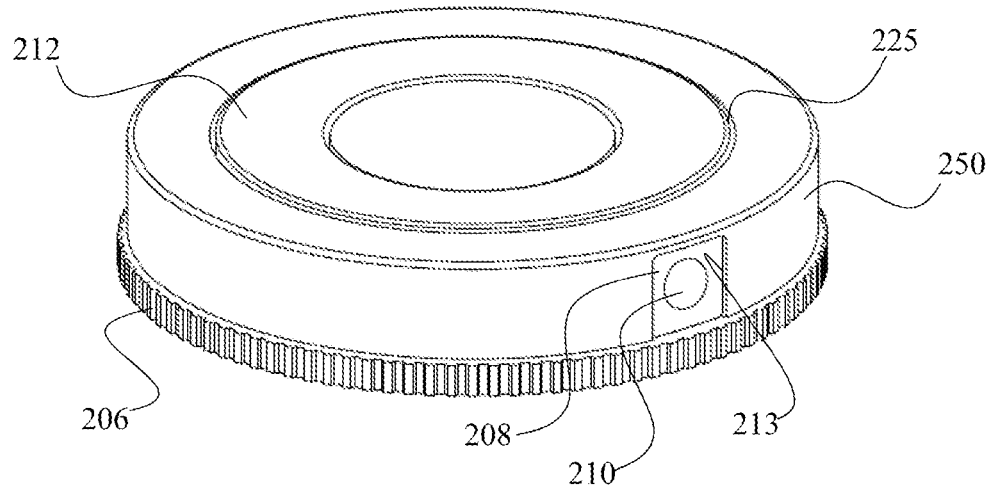
FIG. 3 illustrates an isometric view of the magnetic support accessory of FIG. 2A, in which a housing thereof is removed.

In addition, the first housing part 202a and the second housing part 202b may be comprised of one or more non-metal materials. Importantly, as discussed in detail below, the characteristics and/or properties of the material(s) that comprise at least the second housing part 202b must allow for a magnetic attraction to occur between a magnetic element of a portable electronic device (e.g., magnetic element 112 in the embodiment depicted in FIG. 1B) and a corresponding magnetic element (not shown herein) of the magnetic support accessory 200 (see e.g., magnetic element 212, which is depicted in FIG. 3 and discussed below). Several non-limiting examples of suitable non-metal materials may include various synthetic (and in some cases malleable) compounds, such as silicone, rubber, and other types of elastomers, as well as either synthetic or semi-synthetic polymers, such as plastic compounds, plastic composites, and resins. Also, according to some exemplary embodiments, one or both of the first housing part 202a and the second housing part 202b may be constructed using a combination or an amalgamation of multiple non-metal materials. For example, one of the housing parts (i.e., parts 202a, 202b) may comprise a plastic base having an external silicone layer that is applied thereto using various techniques, including thermal-based processes. For example, an external silicone layer may be applied to a plastic base using a type of liquid silicone rubber injection molding process (or "LSR").

Alternatively, according to other exemplary embodiments, first housing part 202a and/or second housing part 202b may be comprised of one or more metal or metallic materials (e.g., nickel, aluminum, or copper, etc.), a metal alloy (e.g., Nitinol or steel, etc.), or a composite thereof. Further, the first housing part 202a and/or the second housing part 202b may include a high polished chrome.

Referring still to FIGS. 2A through 2D, the cylindrical housing 201 may define a diameter 220 and a circumference 222.

With respect to FIG. 3, there is depicted a further view of the magnetic support accessory 200 in accordance with the exemplary embodiment shown in FIGS. 2A through 2D. Similarly to the illustration in FIG. 2D, FIG. 3 depicts a perspective view of a bottom of the magnetic support accessory 200. However, in this depiction, housing 201 is fully removed or omitted in order to make visible magnetic element 212 that, as mentioned above, is disposed internally within second housing part 202b (or the main body). As described in greater detail below, the magnetic element 212 is located within the housing 201 of the magnetic support accessory 200 in near proximity to second surface 204b of second housing part 202b (or main body). In accordance with this particular embodiment, magnetic element 212 is seated, or is otherwise retained, within an internal volume of housing 201, such as, for example, in a void or recess 225 of a core block 250 positioned within the internal volume. As described below, the core block 250 is positioned within the internal volume of housing 201 and, specifically, within the second housing part 202b (or main body). Accordingly, referring briefly to FIG. 6 and as described below, the magnetic element 212 is held stationary or in position between core block 250 and an interior surface 303 of the second housing part 202b. In addition, referring again to FIG. 3, according to the particular embodiment depicted therein, magnetic element 212 has a circular or annular ring-like shape. Additionally, the dimensions and shape of the magnetic element 212 may be equal to, or are substantially equal to, the dimensions and shape of, for example, the magnetic element 112 of portable electronic device 100 (as described above and depicted in FIGS. 1A and 1B). Further, according to certain other exemplary embodiments, magnetic element 212 may comprise a set or an array of discrete magnets or magnetic elements (not shown) that may be positioned adjacent, or in close proximity to, each other to form the circular or annular shape depicted in FIG. 3.

As mentioned above and described in further detail below, the magnetic support accessory 200 is configured to structurally and impermanently engage a surface of a portable electronic device in order to structurally support the mass and weight of the portable electronic device on, or at, an underlying supporting structure or surface. Further, as mentioned above, according to the embodiments that are described herein, the structural engagement comprises a magnetic engagement or attachment in which the one or more magnetic elements 212 that are located within the housing 201 of magnetic support accessory 200 are utilized to attract one or more corresponding magnetic elements (e.g., magnetic element 112 of the portable electronic device 100 shown in FIGS. 1A and 1B) in order to attach the magnetic support accessory 200 to the portable electronic device.

Referring again to FIGS. 2A through 2D, further depicted therein is an extendable connector 208 (or leg) that, when in an actuated, a deployed, or an extended configuration, position, or state, may be impermanently attached, coupled, or affixed to, or seated upon, an underlying supporting structure or surface (not shown). Axiomatically, when the extendable connector 208 is utilized in this manner, magnetic support accessory 200 may be attached to, coupled to, affixed to, or seated upon, or otherwise engaged with, an underlying supporting structure or surface vis-à-vis the extendable connector 208. When not in use, the extendable connector 208 may be selectively moved or retracted to an internal location within the internal volume of housing 201 of magnetic support accessory 200. With respect to the embodiment depicted in FIGS. 2A through 2D, extendable connector 208 is located at and within second housing part 202b (or main body) of the magnetic support accessory 200. Each of FIGS. 2A through 2D depict the extendable connector 208 in its unactuated, undeployed, or retracted configuration, position, or state. As indicated, when in a fully retracted position, extendable connector 208 is flush with, or substantially flush with, an exterior surface of housing 201 such that no part or surface of extendable connector 208 protrudes or projects out from housing 201. As such, extendable connector 208 may be easily and efficiently stored within the magnetic support accessory 200 when it is not in use, thus maintaining the smooth and slim profile and exterior of the magnetic support accessory 200.

Figure 4:
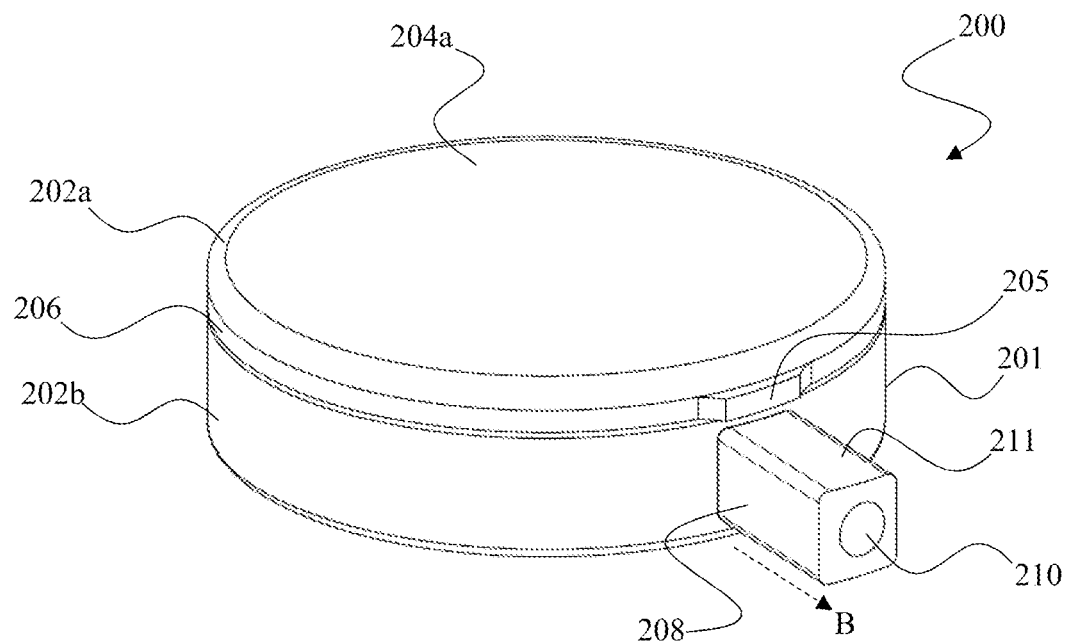
FIG. 4 illustrates an isometric view of the magnetic support accessory of FIG. 2A, in which an extendable connector or leg thereof is in an actuated or extended configuration or position.

With respect to FIG. 4, there is shown the magnetic support accessory 200 according to the particular embodiment depicted in FIGS. 2A through 2D. However, in the viewpoint provided in FIG. 4, extendable connector 208 now appears in its fully actuated, deployed, or extended configuration, position, or state in which it has shifted outwards or distally from the housing 201 in the direction of dotted arrow "B." As indicated, extendable connector 208 now protrudes or projects out from the housing 201 of the magnetic support accessory 200. Thus, in order that there be clearance or a throughway for the extendable connector 208 to be retracted within, as well as extended outward from, the housing 201, a close-fitting or suitable opening or aperture 213 (as shown in, for example, FIG. 2A) may be formed (e.g., die cut, punched, or thermally created) within the exterior surface or wall of the second housing part 202b of the housing 201.

Further, according to some exemplary embodiments, a user may manually transition the extendable connector 208 between its unactuated, undeployed, or retracted configuration, position, or state and its actuated, deployed, or extended configuration, position, or state, by directly manipulating the distal end 211 of extendable connector 208. However, any suitable mechanism, electrical and/or mechanical, may be employed that permits a user to selectively control, without directly touching the extendable connector 208, the retraction and extension of the extendable connector 208 relative to the housing 201. For example, with respect to the particular embodiment shown in FIGS. 2A through 2D, the magnetic support accessory 200 comprises a rotatable control ring 206 that, when manually rotated by a user, imposes a contact force to a portion of a proximal end of the extendable connector 208 that is contained within housing 201 (not shown therein). As a result of the contact force that is imposed, extendable connector 208 may be extended away from the housing 201 in a distal direction (i.e., in the direction of arrow "B" shown in FIG. 4) and/or retracted towards housing 201 in a proximal direction. According to some embodiments, the rotatable control ring 206 may be rotated in a single direction (e.g., in a clockwise direction or a counterclockwise direction) to effect the extension and/or the retraction movement of the extendable connector 208. According to other exemplary embodiments, the rotatable control ring 206 may be rotated both in a clockwise direction and a counterclockwise direction (e.g., according to the arrow "A" that is indicated in FIG. 2A), with each direction correlating to the extension or the retraction of the extendable connector 208. This manually operated mechanical control mechanism is described in greater detail below.

As best shown in FIGS. 2A, 2B, and 4, the rotatable control ring 206 has a diameter and circumference that are equal to, or are substantially equal to, the diameter 220 and the circumference 222 of housing 201 of magnetic support accessory 200. Further, the rotatable controller ring 206 is positioned between, and at the junction of, the first housing part 202a and second housing part 202b of housing 201. Further, as depicted, rotatable control ring 206 may comprise a raised, protruding, or projecting portion 205 (or tab) that provides a visual and/or a tactile aid or marker to assist the user in locating, identifying, and manually operating rotatable control ring 206.

Further, with respect to the particular embodiment that is shown in FIGS. 2A-2D, 3, and 4, extendable connector 208 may further comprise an internal aperture 210 at its distal end 211. This aperture 210 may constitute, for example, a female component that forms a mating connection, coupling, or attachment with a corresponding male component present on or at an underlying supporting structure or surface. However, alternatively, in some exemplary embodiments, the distal end 211 of extendable connector 208 may be shaped and configured to instead constitute the male component that forms a mating connection, coupling, or attachment with a corresponding female component of an underlying supporting structure or surface. Generally, distal end 211 of the extendable connector 208 may comprise any suitable type of connector or component that is capable of forming a particular attachment, connection, or engagement with a corresponding connector, component, or surface that is specific to a desired underlying supporting structure or surface to which the magnetic support accessory will be attached. According to some exemplary embodiments, aperture 210 may comprise a threaded interior portion (not shown) that is matingly turned, threaded, or screwed onto a series of corresponding threads of a connector that is present at the underlying supporting structure or surface.

Figure 5A:
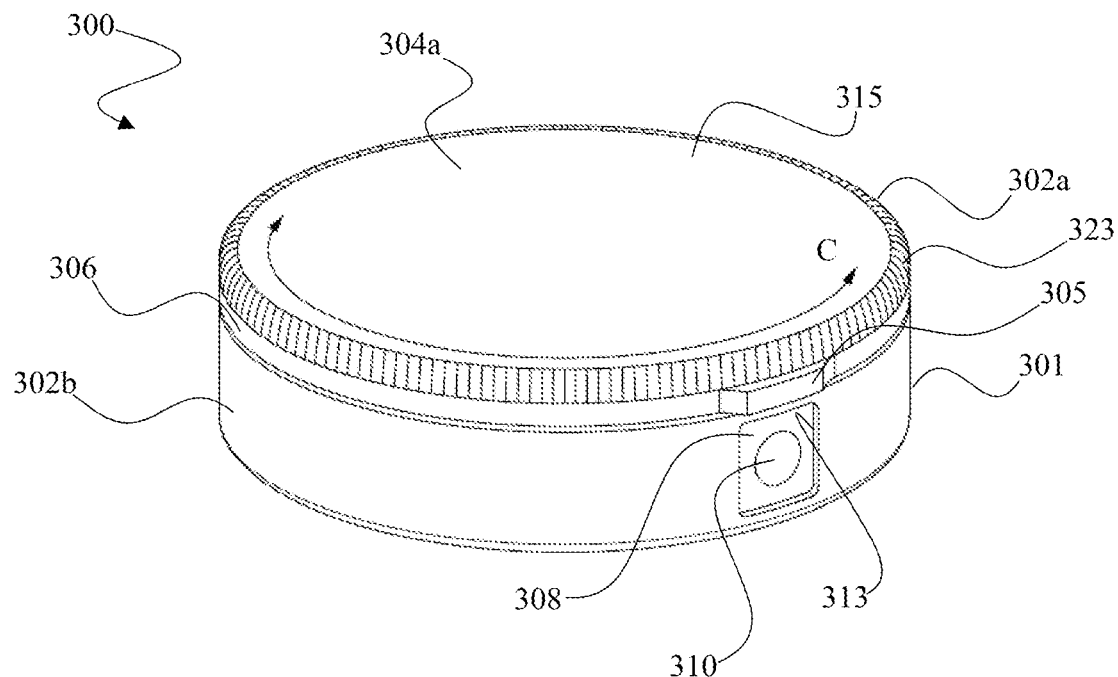
FIG. 5A illustrates an isometric view of an alternative exemplary embodiment of a magnetic support accessory.
Figure 5B:
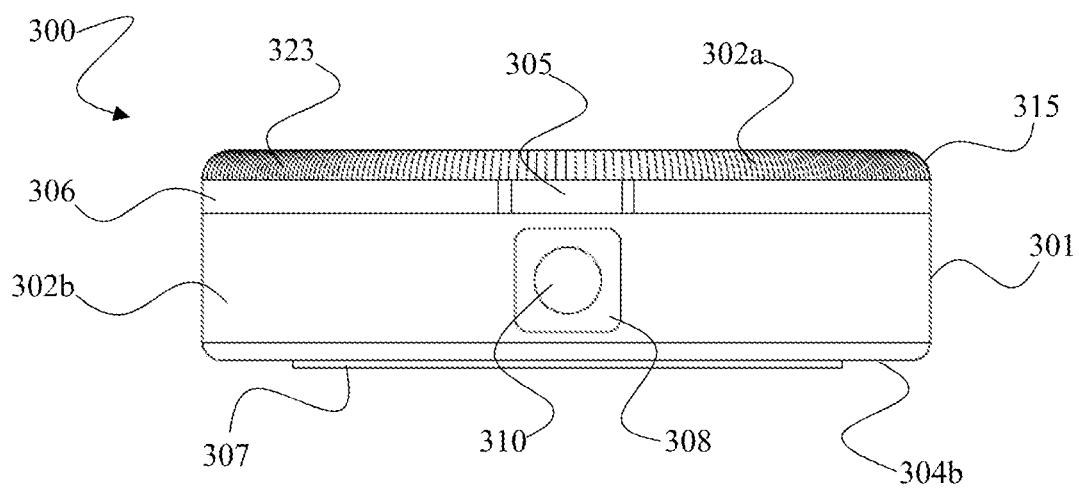
FIG. 5B illustrates a side view of the magnetic support accessory of FIG. 5A.

With respect to FIGS. 5A and 5B, there is pictured an exemplary embodiment of a magnetic support accessory 300. FIG. 5A provides a perspective view of the magnetic support accessory 300. Further. FIG. 5B provides a side view of magnetic support accessory 300. In several aspects, magnetic support accessory 300 is closely similar in structure and function to magnetic support accessory 200, which was described above with reference to FIGS. 2A-2D, 3, and 4. For example, similar to the exemplary embodiment of magnetic support accessory 200, magnetic support accessory 300 comprises a first housing part 302a and a second housing part 302b. Together, the first housing part 302a and second housing part 302b form housing 301, wherein housing 301 comprises an internal volume (not shown). According to this particular embodiment, first housing part 302a may be characterized as, or constitute, a top or a cap of housing 301 and second housing part 302b may be characterized as, or constitute, the main body of housing 301. Further, the housing 301 is cylindrical and has a three-dimensional disc-like or "puck"-like shape.

Further, as indicated in FIGS. 5A and 5B, the first housing part 302a of housing 301 may comprise a first surface (or side) 304a. In a similar vein, the second housing part 302b of housing 301 may comprise a second surface (or side) 304b. As shown, first surface 304a and second surface 304b constitute opposite faces of housing 301.

In addition, similar to the embodiment of the magnetic support accessory 200 as depicted in FIGS. 2A-2D, 3, and 4, magnetic support accessory 300 comprises an extendable connector 308, wherein an opening or aperture 313 permits the extendable connector 308 to be selectively extended outward from housing 301 (while in an actuated, deployed, or extended configuration, position, or state) and selectively retracted into housing 301 as desired and when not being used (i.e., while in an unactuated, undeployed, or retracted configuration, position, or state). As in the case of magnetic support accessory 200, magnetic support accessory 300 comprises a rotatable control ring 306 that, as will be described in greater detail below, is configured to permit a user to control the extension and/or the retraction of the extendable connector 308 by manually rotating control ring 306 relative to housing 301. As depicted, rotatable control ring 306 is positioned in-between, and at the junction of, the first housing part 302a and the second housing part 302b of housing 301. Additionally, the rotatable control ring 306 may further comprises a raised, protruding, or projecting portion 305 (or tab) to facilitate, visually and structurally, the user's operation of the rotatable control ring 306.

As described above with respect to magnetic support accessory 200, the extendable connector 308 may comprise any suitable type of connector, component, or structure, that is capable of structurally (e.g., matingly) connecting to, coupling to, attaching to, or affixed to, a corresponding connector, component, or structure that is present at an underlying supporting structure or surface to which the magnetic support accessory 300 is ultimately engaged in situ. According to the particular embodiment that is shown in FIGS. 5A and 5B, the extendable connector 308 may further comprise, at a distal end 311 thereof, an internal aperture 310 configured to matingly couple to a corresponding male component of a connector present at an underlying supporting structure or surface (not shown).

Although not shown in FIGS. 5A and 5B, magnetic support accessory 300 further comprises one or more magnetic elements 312 positioned within an internal volume of housing 301. The shape, dimensions, relative location within housing 301, and material composition of the one or more magnetic elements 312 is identical to, or substantially identical to, the shape, dimensions, relative internal location, and material composition described above (and depicted, for example, in FIG. 3) with respect to one or more magnetic elements 212 of the exemplary embodiment of the magnetic support accessory 200. Therefore, for the sake of brevity, those aspects are not repeated here.

Referring still to the embodiment shown in FIGS. 5A and 5B, in contrast to the exemplary embodiment of magnetic support accessory 200, magnetic support accessory 300 further includes the ability to establish unidirectional or bi-directional electrical communication with the portable electronic device to which it is magnetically engaged and as a result thereof, control one or more features, parameters, and/or functions of the portable electronic device. As depicted in FIGS. 5A and 5B, the magnetic support accessory 300 comprises a control knob or actuator 315 that, when rotated (for example, manually) by a user (e.g., in the direction of arrow "C" as indicated in FIG. 5A), operates as a user input or interaction device that allows a user to precisely navigate one or more features, parameters, and/or functions of the portable electronic device. Therefore, rather than be limited to interacting with the functionality of the portable electronic device using only the modalities that are provided by the portable electronic device itself, the magnetic support accessory 300 provides an additional avenue that may, in certain instances, be more readily accessible and easier to use because it requires just a simple turn (clockwise and/or counterclockwise rotation) of the control knob or actuator 315 to effectuate certain controls or commands. According to the specific embodiment depicted in FIGS. 5A and 5B, the first housing part 302a of the magnetic support accessory 300 is rotatable and comprises the control knob or actuator 315. However, it should be noted that this specific configuration is only a single non-limiting example. The magnetic support accessory may include any suitable mechanical and/or electrical component that is capable of establishing electrical communication with a portable electronic device and providing a user with the capability to selectively navigate and control one or more aspects of the portable electronic device.

Further, according to the particular embodiment shown in FIGS. 5A and 5B, the presence of the rotatable control knob or actuator 315 constitutes a second rotatable circular structure of the magnetic support accessory 300 in addition to the rotatable control ring 306. Therefore, to assist a user in discerning between the rotatable control knob or actuator 315 and rotatable control ring 306, both visibly and by touch, a distinct texture or other tactile/visual element or feature may be applied to one or both of rotatable control knob or actuator 315 and rotatable control ring 306. For example, as shown in FIGS. 5A and 5B, a ridged surface 323 is applied, for example, along the outer circumference or surface of the rotatable control dial or actuator 315, where a user is most likely to touch and manipulate the rotatable control dial or actuator 315.

The unidirectional or bi-directional electrical communication between the magnetic support accessory 300 and the portable electronic device may be achieved by any suitable mechanism. Certain non-limiting example mechanism may take advantage of the one or more magnetic elements (e.g., magnetic elements 112 and 312) internal to the magnetic support accessory 300 and portable electronic device 100. According to some exemplary embodiments, magnetic element 312 may comprise a magnet array (not shown) that surrounds a near-field communications (NFC) coil (not shown). Further, the near-field communications coil may then be coupled or attached to a near-field communication circuitry, which may include one or more transmitters (not shown). In order to receive data from a near-field communication transmitter within the magnetic support accessory 300, portable electronic device 100 may comprise, for example, a magnetometer (not shown) and a near-field communication receiver (not shown). According to such a configuration, the magnetometer can detect the magnet array (e.g., the magnetic element 312) that is located within magnetic support accessory 300 and, upon this detection, the portable electronic device 100 can generate a magnetic field using the near-field communication receiver. In turn, the near-field communication receiver can detect near-field communication circuitry within the magnetic support accessory 300 (including the near-field communication transmitter) and read information from the transmitter. Accordingly, the near-field communication circuits present in the portable electronic device 100 and the near-field communication circuitry present in the magnetic support accessory 300 may be employed to establish two-way data communications between the two components. A detailed description of exemplary embodiments of near-field communications apparatuses and systems that may be utilized herein is found, for example, in U.S. patent application Ser. No. 17/362,821, which is incorporated herein by reference in its entirety.

According to other exemplary embodiments, the portable electronic device 100 may transmit from an inductive charging coil (not shown) of portable electronic device 100 to an inductive charging coil (not shown) of magnetic support accessory 300, and vice versa. For example, control electronics (not shown) within portable electronic device 100 may generate modulated currents in its respective inductive charging coil. The currents can be modulated in amplitude, frequency, phase, or a combination thereof. In turn, the modulated currents can generate a time-varying magnetic field that can then induce currents in the respective inductive charging coil of the magnetic support accessory 300. As a result, the control circuitry in the magnetic support accessory 300 may process and recover the associated data. Similarly, the control circuitry (not shown) in the magnetic support accessory 300 can provide alternating currents to its respective inductive charging coil (not shown). As a result, the currents that are induced at the charging coil of the magnetic support accessory 300 can generate a time-varying magnetic field that can induce corresponding currents in the respective inductive charging coil within portable electronic device 100. Thereafter, the control circuitry (not shown) in portable electronic device 100 may process and recover the associated data. Therefore, an inductive charging system and interface, when existing in the portable electronic device and magnetic support accessory, may be utilized to establish two-way data communications between the two components. Further, a detailed description of exemplary embodiments of inductive charging apparatuses and systems that may be utilized herein is found, for example, in U.S. patent application Ser. No. 17/362,821, which is incorporated herein by reference in its entirety.

Alternatively, according to some exemplary embodiments, various other wireless communication mechanisms may be used. Examples of such communication mechanisms may include, but are not limited to, Wi-Fi, Bluetooth®, and ZigBee® communication channels and protocols.

In each of the above examples, magnetic support accessory 300 comprises interface and control circuitry (not shown) that precisely associates and correlates the rotation of the rotatable control knob or actuator 315 with the generation, transmission, and receiving of the electrical control signals and other information.

Figure 6:
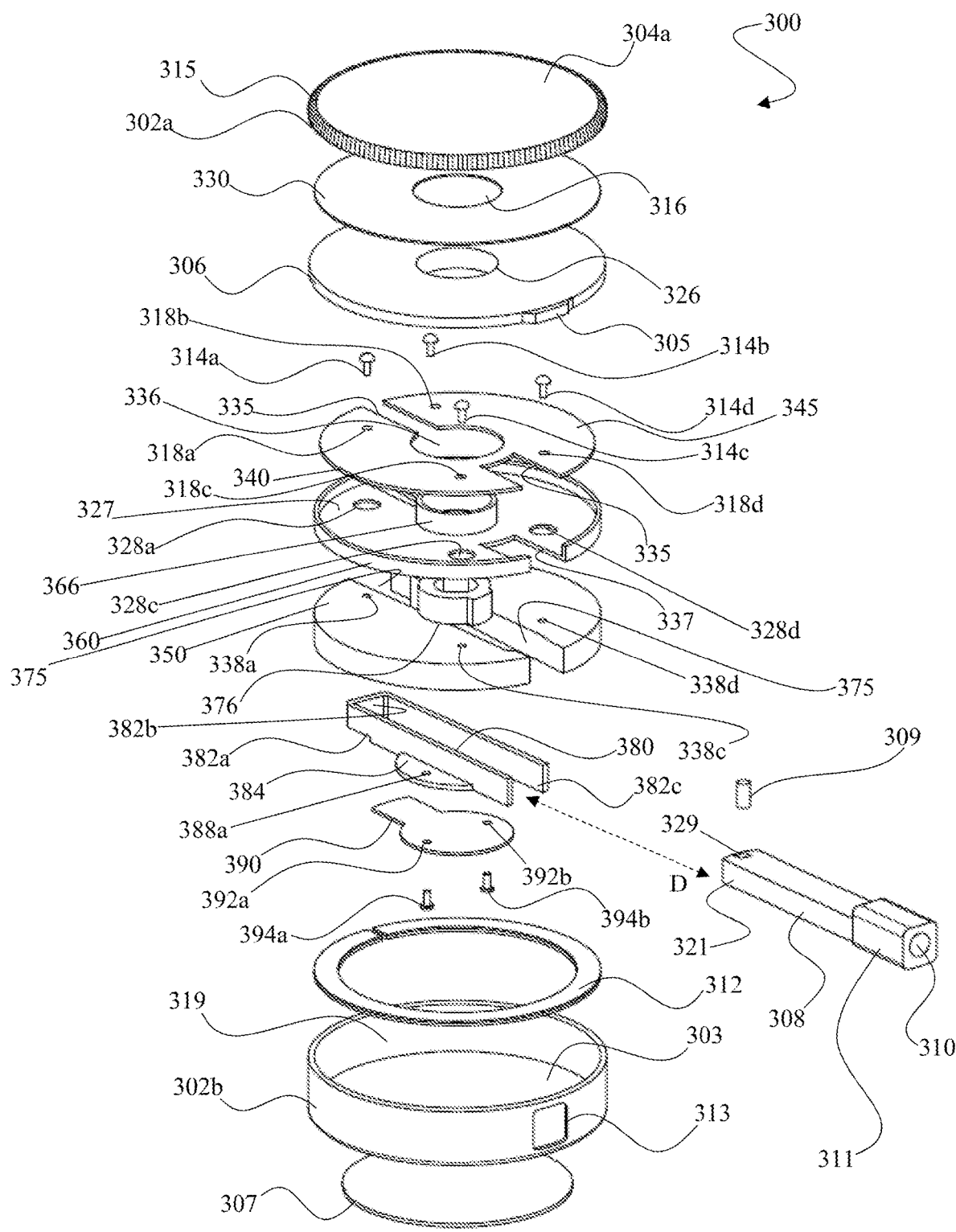
FIG. 6 illustrates an exploded view of the magnetic support accessory of FIG. 5A.

In order to provide a better understanding of the structural interrelationship(s) and mechanical and electrical functionality of and between the several parts or components of the magnetic support accessory 300, an exploded view of the magnetic support accessory 300 is depicted in FIG. 6. Accordingly, FIG. 6 provides a general illustration of multiple constituent parts of the magnetic support accessory 300 as they appear when in a disassembled state.

As shown in FIG. 6, provided is a circular or a cylindrical disc-like shaped second housing part 302b (or main body) of housing 301, wherein second housing part 302b (or main body) has an interior surface 303 and comprises an internal volume 319. In addition, aperture 313 is formed in a wall or surface of second housing part 302b. As described above, aperture 313 allows for an extendable connector 308 (or leg) to be selectively extended out of and retracted into internal volume 319. Further, one or more circular or annular shaped magnetic elements 312 may be positioned within second housing part 302b in order to, as described above, provide a magnetic engaged or attachment ability with respect to a corresponding magnetic element present in a portable electronic device. In addition, an extendable connector 308 (or leg) may be introduced into the internal volume 319, wherein the extendable connector 308 is configured to be able to slide or otherwise shift or move into and out of the internal volume 319 as desired by a user. Accordingly, the internal volume 319 comprises a slide channel 380. As depicted, the slide channel 380 may be affixed or secured to the interior surface 303 of second housing part 302b using, for example, one or more fasteners 394a and 394b, that are inserted into one or more corresponding apertures (one of which is shown at 388a) of a plate extension 384 of the slide channel 380. The slide channel 380 comprises three side walls, 382a, 382b, and 382c, thereby leaving the slide channel 380 accessible from one side to allow the ingress and egress of the extendable connector 308 in, for example, the direction of arrow "D." Further, to improve the strength and stability of the slide channel 380, a bearing cavity stiffener element 390 may be positioned and secured (for example, via fasteners 394a and 394b inserted into corresponding apertures 392a and 392b) between the interior surface 303 of second housing part 302b and the slide channel 380.

It should be noted that second surface 304b of the second housing part 302b, which constitutes the contact surface between magnetic support accessory 300 and portable electronic device 100, may include a high friction or a high stiction material 307 (see also, element 207 of the exemplary embodiment depicted in FIGS. 2A-2D), in order to increase the sturdiness of the magnetic engagement or attachment existing between the magnetic support accessory 300 and portable electronic device 100. High friction or high stiction materials may increase the shear force that is needed to remove the magnetic support accessory 300 from the portable electronic device 100. Suitable high-friction materials may comprise, for example, an elastomer, plastic, PVC plastic, rubber, silicon rubber, polycarbonate (PC), urethane, polyurethane, nitrile, neoprene, silicone, or other materials or combination of materials. In addition, high-friction surfaces may also be formed using an adhesive.

Referring still to FIG. 6, a cylindrical-shaped core block 350 that may be positioned near or atop the slide channel 380 and is seated within internal volume 319, wherein core block 350 provides a foundational alignment and structural support to the rotatable components of the magnetic support accessory 300 (i.e., rotatable control ring 306 and rotatable control knob or actuator 315). The core block 350 may comprise a channel 375 that accommodates the slide channel 380 and the extendable connector 308. Further, core block 350 may comprise a center post or column 376 at a center region of the core block 350, wherein the post or column 376 protrudes away from a base of the core block 350. As indicated in FIG. 6, the center post or column 376 acts to align thereon the rotatable control ring 306 and rotatable control knob or actuator 315. As a result thereof, the rotatable control ring 306 and rotatable control knob or actuator 315 rotate about the center post or column 376.

Further, to boost the strength and stability of the rotatable components and the core block 350, a circular-shaped bearing plate 360 may be affixed or otherwise secured to the core block 350 using, for example, one or more fasteners 314a, 314b, 314c, and 314d, which may be inserted into corresponding apertures 328a, 328c, and 328d (a corresponding fourth aperture is hidden from view) of bearing plate 360. Likewise, the one or more fasteners 314a, 314b, 314c, and 314d may be inserted into corresponding apertures 338a, 338c, and 338d (a corresponding fourth aperture is also hidden from view) of the core block 350, thereby fastening bearing plate 360 to the core block 350. Similarly, bearing plate 360 may comprise a channel 337 for accommodating the slide channel 380. In addition, bearing plate 360 may comprise a post or column 366 at its center region for accommodating the center post or column 376 of core block 350.

In addition, as depicted in FIG. 6, in order to improve the strength and stability of the rotatable components of magnetic support accessory 300, as well as to protect the bearing plate 360 from the forces imposed upon it by the frequent rotation of the rotatable components, a stiffener element 340 may be positioned and secured within a recess 327 of bearing plate 360 using, for example, the one or more fasteners 314a, 314b, 314c, and 314d. As shown in FIG. 6, fasteners 314a, 314b, 314c, and 314d may be inserted into corresponding apertures 318a, 318b, 318c, and 318d of the stiffener element 340 before then proceeding through the corresponding apertures 328a, 328c, and 328d and the corresponding apertures 338a, 338c, and 338d of the bearing plate 360 and core block 350, respectively. Furthermore, stiffener element 340 may comprise a channel 335 for accommodating the slide channel 380 and the extendable connector 308. In addition, stiffener element 340 may comprise a center aperture 336 for accommodating the center posts or columns 366 and 376 of the bearing plate 360 and the core block 350, respectively. As a result, the core block 350, bearing plate 360, and stiffener element 340 are secured in a stacked configuration within the internal volume 319.

Next, rotatable control ring 306 is positioned proximate a top surface 345 of the stiffener element 340. As depicted in FIG. 6, the rotatable control ring 306 comprises a center aperture 326 that is aligned onto and about the center posts or columns 366 and 376 of bearing plate 360 and core block 350, respectively. Accordingly, when rotated, the rotatable control ring 306 rotates securely about, and relative to, the center posts or columns 366 and 376.

Similarly, rotatable control knob or actuator 315 is positioned atop of the rotatable control ring 306, wherein, as previously described, the rotatable control knob or actuator 315 constitutes the first housing part 302a that, together with second housing part 302b, forms the housing 301 of the magnetic support accessory 300. Although it is not visible in FIG. 6, an underside surface (i.e., an opposite surface from first surface 304a) of rotatable control knob or actuator 315 comprises a downward facing center recess or center post that is aligned onto and about the center posts or columns 366 and 376 of bearing plate 360 and core block 350, respectively. Accordingly, when being rotated, rotatable control knob or actuator 315 rotates securely about, and relative to, the center posts or columns 366 and 376. Further, as depicted in FIG. 6, in order to mechanically separate and prevent the rotational movement of one of the rotatable control ring 306 or the rotatable control knob or actuator 315 from interfering with the rotational movement of the other of the rotatable control ring 306 or rotatable control knob or actuator 315, a circular-shaped bearing shim 330 may be positioned in-between the rotatable control ring 306 and the rotatable control knob or actuator 315. Accordingly, the bearing shim 330 may further comprise a center aperture 316 to accommodate the center posts or the columns 366 and 376 of the bearing plate 360 and core block 350, respectively.

In addition, as depicted in FIG. 6, the extendable connector 308, according to this particular embodiment, is in the shape of a three-dimensional rectangular block and comprises a distal end 311 and a proximal end 321. As mentioned above, the distal end 311 of extendable connector 308 is the region of extendable connector 308 that, when desired, may be extended outwards from the housing 301 of the magnetic support accessory 300 and constitutes the "working" or "connecting" end or region of the extendable connector 308. In other words, the distal end 311 of extendable connector 308 is the region or portion of the extendable connector 308 that may be connected, coupled, affixed, or otherwise secured to an underlying supporting structure or surface. However, the proximal end 321 of the extendable connector 308 further comprises a pin 309. A portion of the pin 309 is inserted into an aperture 329 located at the proximal end 321. The remainder of pin 309 protrudes upwards and out from the aperture 329. As described in greater detail below, the rotatable control ring 306 comes into contact with pin 309 along its path of rotation, thereby causing and effectively controlling the extension and retraction of the extendable connector 308.

It should be noted that the various components or parts depicted in FIG. 6 may be comprised of any suitable metal or non-metal material, or a combination of materials. Such materials may include, but are not limited to, aluminum, stainless steel, and polymers, etc.

Figure 7A:
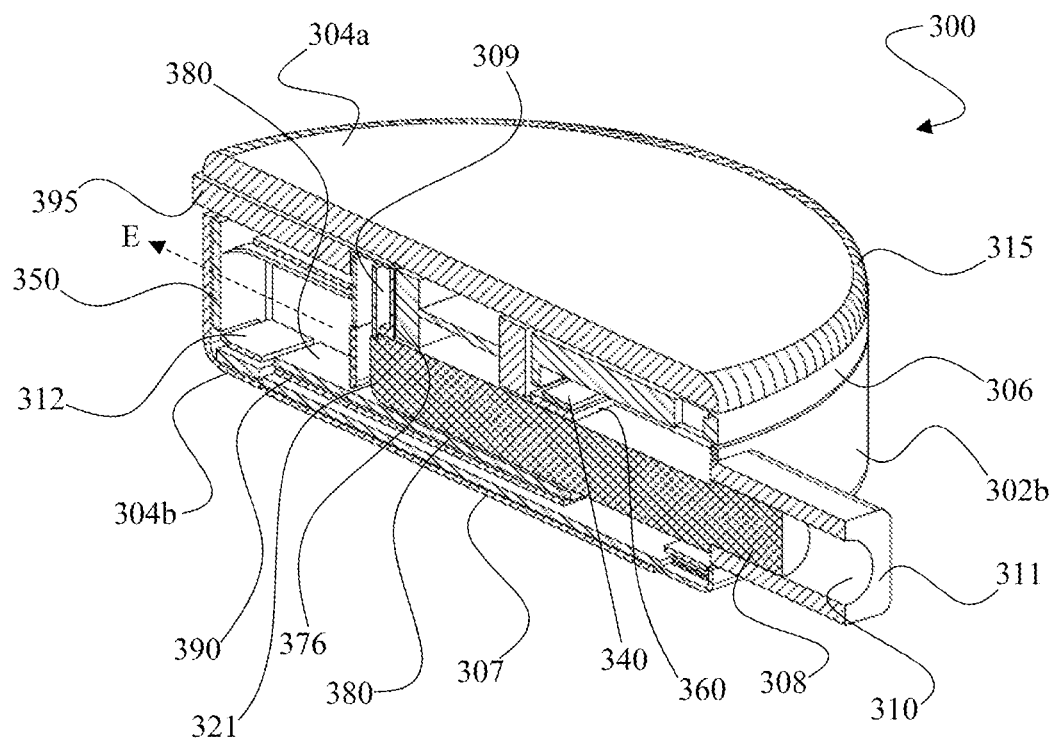
FIG. 7A illustrates a cross-sectional view of a portion of the magnetic support accessory of FIG. 5A, in which an extendable connector or a leg thereof is in an actuated or extended configuration or position.
Figure 7B:
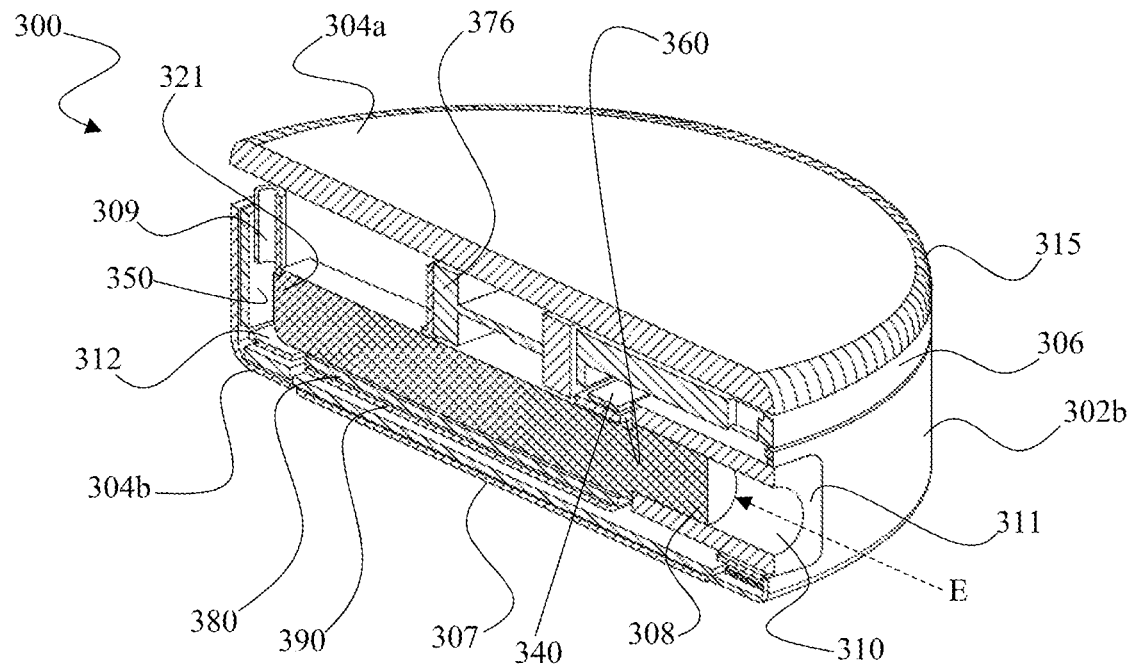
FIG. 7B also illustrates a cross-sectional view of a portion of the magnetic support accessory of FIG. 5A, in which an extendable connector or a leg thereof is in an unactuated or retracted configuration or position.

Referring now to FIGS. 7A and 7B, the cross-sectional views of magnetic support accessory 300 depicted therein are intended to demonstrate, according to one exemplary embodiment, a mechanism for utilizing rotatable control ring 306 to control the movement of extendable connector 308. Beginning with FIG. 7A, the extendable connector 308 is in an actuated, deployed, or extended configuration, position, or state, in which the distal end 311 of extendable connector 308 is protruding or projecting outwards to a degree from housing 301. During this state, rotatable control ring 306 is rotatably positioned such that a portion 395 of rotatable control ring 306 is in contact with, and abuts, pin 309 of the extendable connector 308 such that the extendable connector 308 is prevented from moving any further backwards or into (i.e., in the direction of arrow "E") the slide channel 380. By contrast, in FIG. 7B, the rotatable control ring 306 is now rotatably positioned such that portion 395 of the control ring 306 is no longer in contact with, or abutting, pin 309 of the extendable connector 308. Therefore, the extendable connector 308 is now permitted to retract backwards or into housing 301 (i.e., in the direction of arrow "E") along the full length of slide channel 380, if desired. Thus, in FIG. 7B, extendable connector 308 is now in an unactuated, undeployed, or retracted configuration, position, or state.

Figure 8:
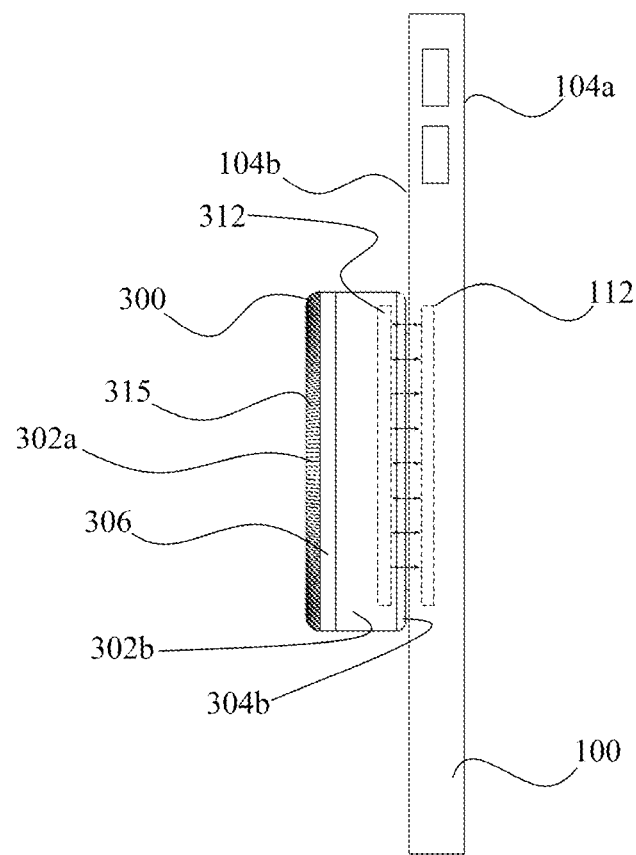
FIG. 8 illustrates a side view of the magnetic support accessory of FIG. 5A, in which the magnetic support accessory is engaged or coupled with a portable electronic device.

As mentioned above, the magnetic support accessory 300 is capable of structurally, impermanently engaging a surface of a portable electronic device and supporting that portable electronic device on an underlying supporting structure or surface. Further, according to the exemplary embodiments described above, the structural engagement may comprise a magnetic engagement or a magnetic attachment. Depicted in FIG. 8 is an exemplary embodiment of a magnetic engagement or attachment occurring between, for example, the magnetic support accessory 300 and a portable electronic device (e.g., portable electronic device 100 described above and pictured in FIGS. 1A and 1B). As shown in FIG. 8, the second surface 304b of the housing 301 of magnetic support accessory 300 is selectively coupled to a surface 104b of the portable electronic device 100. According to this example, the magnetic engagement or the magnetic attachment is achieved by aligning the magnetic element 112 disposed within the portable electronic device 100 with the magnetic element 312 disposed within the magnetic support accessory 300. The bidirectional arrows depicted in FIG. 8 are intended to indicate the magnetic attraction occurring between the corresponding magnetic elements 112 and 312. As such, the magnetic engagement or magnetic attachment is temporary, and the magnetic support accessory may be easily and subsequently disengaged from the portable electronic device 100 when desired.

Figure 9:
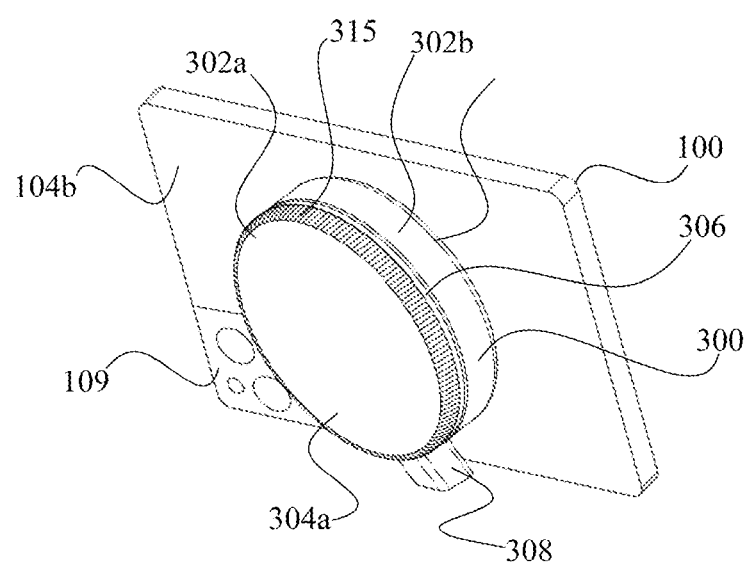
FIG. 9 illustrates the magnetic support accessory of FIG. 5A engaged or coupled with a portable electronic device while in situ.
Figure 10:
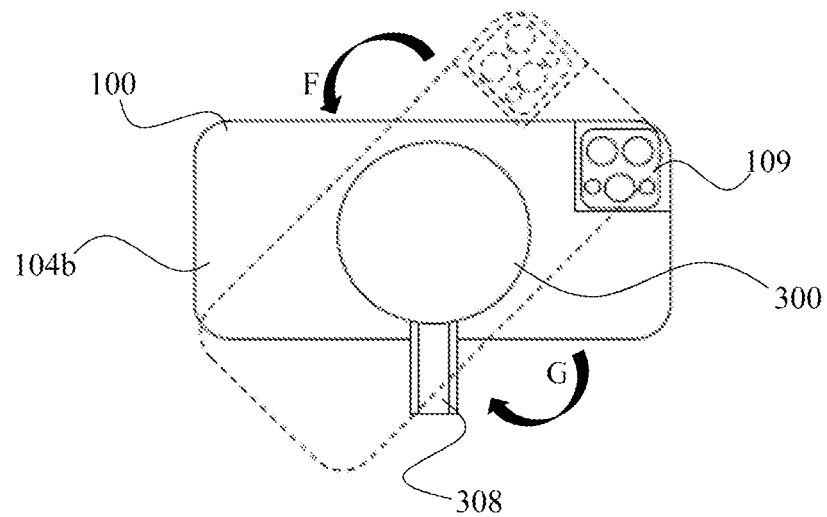
FIG. 10 illustrates a swiveling and/or a rotating movement of a portable electronic device in relation to the magnetic support accessory of FIG. 5A, while the portable electronic device is engaged or coupled with the magnetic support accessory.

With respect to FIG. 9, there is depicted a magnetic support accessory, such as, for example, magnetic support accessory 300, while it is magnetically engaged or attached with a portable electronic device 100 while in situ. As shown, magnetic support accessory 300 is magnetically engaged with a rearward facing or back surface 104b of portable electronic device 100. Further, in this particular depiction, an extendable connector 308 of the magnetic support accessory 300 is shown in an actuated, deployed, or an extended position or state relative to the housing 301 such that it is projecting or protruding outward from housing 301. In such a configuration, the magnetic support accessory 300 is capable of positioning and supporting the portable electronic device 100 in an upright or semi-upright position and is capable of engaging an underlying supporting structure or surface (not shown) as a support foundation vis-à-vis the extendable connector 308.

Further, it should be noted that, according to this configuration, the rotatable control knob or actuator 315 is readily visible and easily accessible to a user for the user's manual manipulation.

Importantly, according to the magnetic properties of magnetic element 112 and/or magnetic element 312, and as afforded by the continuous magnetic engagement that is made possible by the corresponding circular or annular shapes of the magnetic elements 112 and 312, portable electronic device 100 and/or the magnetic support accessory 300 may be rotated with respect to the other without disengaging the magnetic engagement or attachment between the portable electronic device 100 and the magnetic support accessory 300. For example, as demonstrated in FIG. 10, the portable electronic device 100 may be swiveled or rotated (e.g., in the direction of arrow "F", and/or in the opposite direction, i.e., in the direction of arrow "G") relative to the magnetic support accessory 300, while in situ and while the magnetic support accessory 300 remains stationary and/or is anchored. As such, any angular adjustments may be made to the orientation and position of the portable electronic device 100 while the portable electronic device 100 is supported by the magnetic support accessory 300. For example, the portable electronic device 100 may be readily and quickly switched between a landscape (or horizontal) orientation and a portrait (or vertical) orientation when engaged with the magnetic support accessory 300. This capability is particularly useful and applicable while operating the portable electronic device 100 in situ and in instances where adjustments must be made quickly and with ease.

Figure 11:
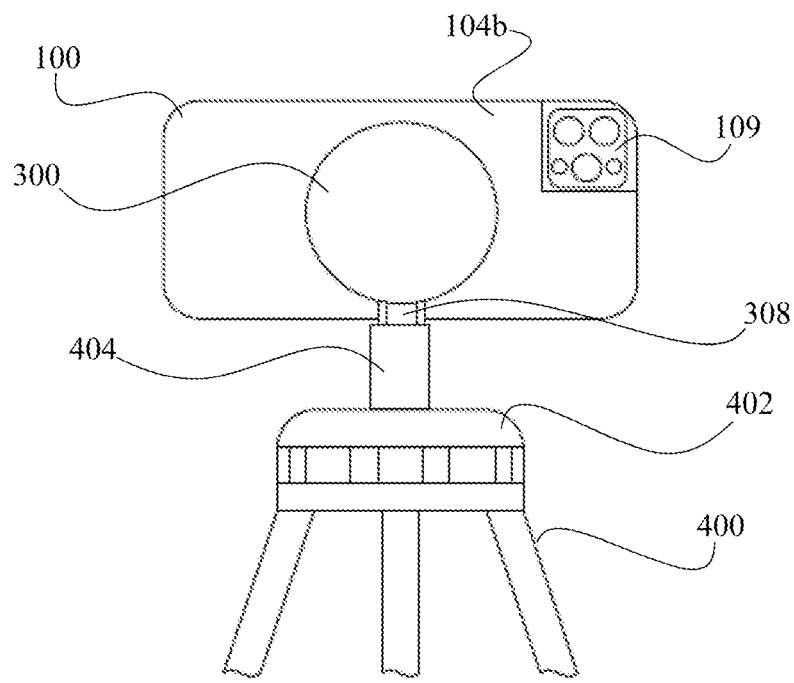
FIG. 11 illustrates the magnetic support accessory of FIG. 5A while seated at, or coupled to, an underlying supporting structure or surface (in this example, a camera tripod), wherein the magnetic support accessory is engaged or coupled with a portable electronic device.

With respect to FIG. 11, demonstrated therein is an exemplary embodiment of a structural support function of a magnetic support accessory, such as the magnetic support accessories according to the exemplary embodiments described above. For the sole purpose of illustration, the magnetic support accessory 300 according to the embodiment that is shown in FIGS. 5A and 5B is depicted in FIG. 11 as an example. As shown in FIG. 11, the extendable connector 308 for example, of magnetic support accessory 300, allows for magnetic support accessory 300 and, by extension, a portable electronic device (e.g., device 100) that is supported therein, to be coupled (or connected, affixed, attached, or seated at or upon) an underlying supporting structure or surface. In the example environment that is depicted in FIG. 11, the underlying supporting structure comprises a camera tripod 400, wherein the portable electronic device 100 is being used to capture photographic and/or videographic content. A camera tripod 400 acts to position and stabilize any image capturing equipment that may be mounted thereto. Further, according to this specific example, the camera tripod 400 includes a tripod head 402 to which a photography and/or a videography device may be selectively and temporarily mounted for use. In addition, the tripod head 402 may comprise a tripod connector 404, which may ordinarily be matingly coupled to a corresponding connector of the photography and/or videography device. However, as illustrated in FIG. 11, the extendable connector 308 of the magnetic support accessory 300 is placed in an actuated, deployed, or extended position or configuration and is matingly coupled to the corresponding tripod connector 404. Accordingly, the view that is illustrated in FIG. 11 is from the viewpoint or perspective of a user positioned before (or in front of) portable electronic device 100 and looking towards or head-on to the rearward or back surface 104b such that a camera lens assembly 109 of the portable electronic device 100 is facing and capturing the user. Further, according to this depiction, the portable electronic device 100 is oriented with respect to the magnetic support accessory 300 such that portable electronic device 100 is positioned in a horizontal (or landscape) orientation relative to the user. However, as mentioned above, the magnetic engagement or attachment between the magnetic support accessory 300 and the portable electronic device 100 permits the angular adjustment of the portable electronic device 100 relative to the magnetic support accessory 300 while in situ and without requiring that the portable electronic device 100 be disengaged, repositioned, and then reengaged in the newly desired position.

Other illustrative examples of underlying supporting structures or surfaces that may benefit from the coupling, engaging, and/or mounting capability of a portable electronic device vis-à-vis the magnetic support accessory include, but are not limited to, monopods, docking stations, other telescoping device stands or sticks, table or desk top surfaces, vehicle dashboards, wearable articles (e.g., an athletic armband or headband), separate electronic computing and/or display devices (e.g., a laptop screen or television), etc.

Figure 12:
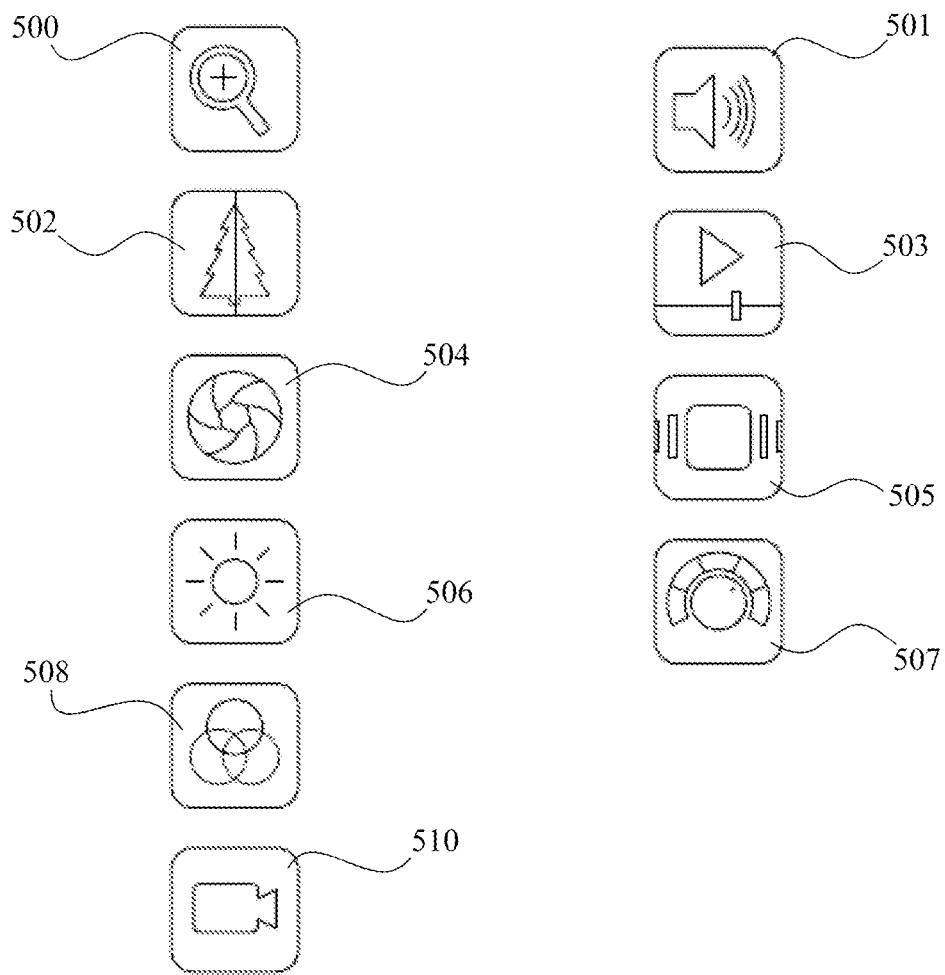
FIG. 12 illustrates various examples of settings, parameters, and/or functions of a portable electronic device that may be controlled or selected by a user using a rotatable control knob or actuator component of the magnetic support accessory of FIG. 5A.

Referring now to FIG. 12, there is depicted functional icons (that may appear, for example, in a user graphical interface) of several non-limiting examples of various features, settings or parameters, and/or functions of a portable electronic device that may be particularly beneficial for access and control by the rotatable control knob or actuator 315 in the manner described in detail above. According to certain exemplary embodiments, such controllable features, setting or parameters, and/or functions may be specific to the camera functions of the portable electronic device (as especially applicable when using the magnetic support accessory within a photography and/or videography context). Suitable examples may include, but are not limited to, "Zoom" 500, "Focus" 502, "Depth of Field" 504, "Exposure Compensation" 506, "Filter Selector" 508, and "Camera Mode" 510. However, in other exemplary embodiments, features, setting or parameters, and/or functions that relate to operational aspects of the portable electronic device other than camera operation (e.g., web navigation, text messaging, music playing, image or video editing, etc.) are further envisioned as being both accessible and controllable by way of the rotatable control knob or actuator 315. Such features, setting or parameters, and/or functions may include, but are not limited to, "Volume" 501, "Video Scrubbing" 503, "Cover Flow" 505, and "Tool Switcher" 507.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A support accessory suitable for use with a handheld electronic device having a magnetic element, the support accessory comprising:
    a housing that defines an internal volume;
    a magnetic attachment element housed within the internal volume and capable of a magnetic attachment with the magnetic element; and
    an extendable support element comprising i) a distal end and ii) an aperture at the distal end, the extendable support element carried by the housing within the internal volume and capable of transitioning between a retracted state and an extended state, wherein:
        (i) the retracted state comprises the extendable support element, including the aperture, wholly disposed within the internal volume; and aperture, wholly disposed within the internal volume; and
        (ii) the extended state comprises the extendable support element at least partially extended outward through an opening in the housing such that, during the magnetic attachment, the extendable support element is capable of providing support to the handheld electronic device.

2. The support accessory of claim 1, wherein the housing comprises:
    a first housing part and a second housing part; and
    a rotatable control element positioned between the first housing part and the second housing part and, when rotated, capable of transitioning a state of the extendable support element between the retracted state and the extended state.

3. The support accessory of claim 2, wherein the rotatable control element comprises a contact surface that, upon a first degree of rotation of the rotatable control element, abuts a projecting portion of the extendable support element such that the extendable support element is in the extended state.

4. The support accessory of claim 3, wherein upon a second degree of rotation of the rotatable control element, the contact surface is spaced away from the projecting portion of the extendable support element such that the extendable support element is in the retracted state.

5. The support accessory of claim 1, wherein the extendable support element further comprises a connector element capable of coupling to a corresponding connector element of an auxiliary support structure.

6. The support accessory of claim 5, wherein the magnetic attachment is such that an orientation of the handheld electronic device is adjustable during the magnetic attachment and while the connector element of the extendable support element is coupled to the corresponding connector element of the auxiliary support structure.

7. The support accessory of claim 1, wherein the housing is cylindrical.

8. A support accessory for use with a portable electronic device that has a magnetic element, the accessory comprising:
    a housing that defines an internal volume;
    a magnetic attachment element housed within the internal volume and capable of a magnetic attachment with the magnetic element;
    an extendable support element carried by the housing within the internal volume and capable of transitioning between a retracted state and an extended state, the extendable support element comprising an aperture, wherein:
        (i) the retracted state comprises the extendable support element wholly disposed within the internal volume; and
        (ii) the extended state comprises the extendable support element at least partially extended outward through an opening in the housing such that, during the magnetic attachment, the extendable support element is capable of providing support to the portable electronic device;
    a pin disposed in the aperture; and
    a rotatable control element, wherein the rotatable element, when rotated, is capable of contacting the pin and transitioning a state of the extendable support element between the retracted state and the extended state.

9. The support accessory of claim 8, wherein the rotatable control element comprises a contact surface that, upon a first degree of rotation of the rotatable control element, abuts a projecting portion of the extendable support element such that the extendable support element is in the extended state.

10. The support accessory of claim 9, wherein upon a second degree of rotation of the rotatable control element, the contact surface is spaced away from the projecting portion of the extendable support element such that the extendable support element is in the retracted state.

11. The support accessory of claim 8, wherein the extendable support element further comprises a connector element capable of coupling to a corresponding connector element of an auxiliary support structure.

12. The support accessory of claim 11, wherein the magnetic attachment is such that an orientation of the portable electronic device is adjustable while the connector element of the extendable support element is coupled to the corresponding connector element of the auxiliary support structure.

13. The support accessory of claim 8, wherein:
    the rotatable control element is a first rotatable control element; and
    the housing further comprises a second rotatable control element capable of electrical communication with, and affecting a function of, the portable electronic device.

14. The support accessory of claim 8, wherein the housing is cylindrical.

15. A support accessory suitable for use with a handheld electronic device having a magnetic element, the support accessory comprising:
    a housing that defines an internal volume;
    a magnetic attachment element housed within the internal volume and capable of a magnetic attachment with the magnetic element;
    an extendable support element carried by the housing within the internal volume and capable of transitioning between a retracted state and an extended state, wherein:

(i) the retracted state comprises the extendable support element wholly disposed within the internal volume; and (ii) the extended state comprises the extendable support element at least partially extended outward through an opening in the housing such that, during the magnetic attachment, the extendable support element is capable of providing support to the handheld electronic device; and a rotatable control element comprising a projecting portion configured to facilitate operation of the rotatable control element.

16. The support accessory of claim 15, wherein;

the rotatable control element is further capable of electrical communication with, and affecting a function of, the handheld electronic device, and the electrical communication comprises an electrical communication pathway that includes at least one of:

a near-field communication apparatus;

an inductive charging coil apparatus; and a wireless Bluetooth apparatus.

17. The support accessory of claim 16, wherein the extendable support element further comprises a connector element capable of coupling to a corresponding connector element of an auxiliary support structure.

18. The support accessory of claim 17, wherein:

the auxiliary support structure comprises a camera tripod; and the function is associated with a camera assembly of the handheld electronic device.

19. The support accessory of claim 17, wherein the magnetic attachment is such that an orientation of the handheld electronic device is adjustable while the connector element of the extendable support element is coupled to the corresponding connector element of the auxiliary support structure.

20. The support accessory of claim 15, wherein the projecting portion provides an aid for user operation of the rotatable control element.

* * * * *